United States Patent
Snider et al.

(10) Patent No.: US 10,445,754 B2
(45) Date of Patent: Oct. 15, 2019

(54) MULTI-NETWORK TRANSACTION ANALYSIS

(71) Applicant: The Western Union Company, Englewood, CO (US)

(72) Inventors: Elizabeth Snider, Denver, CO (US); Teresa Chipps, Castle Rock, CO (US); Nancy Buxo, Castle Pines, CO (US); Lyndsy Clark, Denver, CO (US); Rachel Dimond, Littleton, CO (US); Jeremy Winchester, Bloomington, IN (US)

(73) Assignee: The Western Union Company, Denver, CO (US)

( * ) Notice: Subject to any disclaimer, the term of this patent is extended or adjusted under 35 U.S.C. 154(b) by 431 days.

(21) Appl. No.: 15/265,014

(22) Filed: Sep. 14, 2016

(65) Prior Publication Data

US 2017/0076306 A1    Mar. 16, 2017

Related U.S. Application Data

(60) Provisional application No. 62/218,559, filed on Sep. 14, 2015.

(51) Int. Cl.
| | |
|---|---|
| *G06Q 30/02* | (2012.01) |
| *G06Q 20/32* | (2012.01) |
| *H04W 4/02* | (2018.01) |
| *G06Q 20/18* | (2012.01) |

(52) U.S. Cl.
CPC ......... *G06Q 30/0205* (2013.01); *G06Q 20/18* (2013.01); *G06Q 20/325* (2013.01); *G06Q 20/3224* (2013.01); *H04W 4/02* (2013.01)

(58) Field of Classification Search
CPC ............... G06Q 30/0205; G06Q 20/18; G06Q 20/3224; G06Q 20/325; H04W 4/02
See application file for complete search history.

(56) References Cited

U.S. PATENT DOCUMENTS 7,725,580 B1 *   5/2010   Weigand ............ G11B 20/0084
                                                    709/225
8,655,726 B1 *   2/2014   Favero ............... G06Q 30/0205
                                                    701/429

(Continued)

*Primary Examiner* — Sujay Koneru
(74) *Attorney, Agent, or Firm* — Kilpatrick Townsend & Stockton LLP

(57) ABSTRACT

Techniques described herein relate to analyzing location-based transaction systems, based on data from multiple client devices detected and received via multiple communication networks, and providing customized data to client devices associated with particular locations and/or users of the transaction system. The characteristics of a transaction system and/or specific client locations of the transaction system may be determined, based on data received from multiple client devices. A back-end system may receive data from one or more digital kiosk systems associated with particular locations in a transaction system network, various mobile computing devices of users, and client computers within the transaction system. One or more back-end servers may analyze the data to determine various characteristics of the transaction system and/or characteristics of one or more particular locations in the transaction system network.

20 Claims, 16 Drawing Sheets

(56) References Cited

U.S. PATENT DOCUMENTS

| | | | |
|---|---|---|---|
| 2005/0010475 A1* | 1/2005 | Perkowski | G06Q 30/02 705/14.51 |
| 2006/0095790 A1* | 5/2006 | Nguyen | G06O 20/3224 713/186 |
| 2007/0127691 A1* | 6/2007 | Lert, Jr. | G06Q 30/02 379/265.05 |
| 2009/0076875 A1* | 3/2009 | Lert, Jr. | G06Q 30/016 705/14.3 |
| 2009/0108015 A1* | 4/2009 | Kreamer | G06Q 20/105 221/8 |
| 2010/0057924 A1* | 3/2010 | Rauber | G06Q 30/00 709/229 |
| 2010/0317377 A1* | 12/2010 | Zou | G06Q 10/02 455/466 |
| 2012/0016518 A1* | 1/2012 | Saario | G06Q 20/18 700/232 |
| 2012/0059911 A1* | 3/2012 | Randhawa | G06F 19/321 709/219 |
| 2013/0205243 A1* | 8/2013 | Rivera | G06F 3/04817 715/776 |
| 2014/0052463 A1* | 2/2014 | Cashman | G06Q 20/18 705/2 |
| 2014/0249742 A1* | 9/2014 | Krivacic | G06Q 10/02 701/400 |
| 2015/0066606 A1* | 3/2015 | Smirin | G06Q 30/0633 705/13 |
| 2015/0088694 A1* | 3/2015 | Ackerman | G06Q 10/087 705/26.62 |
| 2015/0088698 A1* | 3/2015 | Ackerman | G06Q 30/0641 705/26.82 |
| 2015/0088731 A1* | 3/2015 | Ackerman | G06Q 30/0603 705/39 |
| 2015/0278879 A1* | 10/2015 | Nickerson | G06Q 30/0276 705/14.72 |
| 2016/0055429 A1* | 2/2016 | Schwartz | G06Q 10/02 705/5 |
| 2016/0132849 A1* | 5/2016 | Melo | G06Q 20/18 705/57 |
| 2016/0232609 A1* | 8/2016 | Lindemulder | G06Q 40/04 |
| 2017/0061458 A1* | 3/2017 | Elangovan | G06Q 30/0205 |

\* cited by examiner

MULTI-NETWORK TRANSACTION ANALYSIS

CROSS-REFERENCE TO RELATED APPLICATIONS

This application is a non-provisional of and claims the benefit and priority under 35 U.S.C. 119(e) of U.S. Provisional Application No. 62/218,559, filed Sep. 14, 2015, entitled "DIGITIZED PHYSICAL KIOSK NETWORKS," the entire contents of which are incorporated herein by reference for all purposes.

BACKGROUND OF THE INVENTION

Field of the Invention

The present invention relates generally to analyzing and customizing a location-based transaction system, based on data from a combination of multiple devices configured to detect and transmit location data and transaction system data via multiple different communications networks.

Description of the Related Art

Aspects described herein relate to electronic content and services provided via remote networks of specialized electronics devices. For example, interactive digital kiosks, automated teller machines, and terminals and tablets configured for user self-service and/or agent-assisted customer service may be installed at various remote locations to be convenient and accessible to users. Different types of specialized devices installed at such locations may allow users to initiate computing sessions (e.g., Internet kiosks, gaming kiosks, social networking kiosks, etc.), perform secure data transfers and/or initiate communication sessions (e.g., terminals providing real-time voice, data, and/or video conferencing), make purchases and perform other financial transactions (e.g., online shopping kiosks, financial transfer kiosks, automated teller machines, etc.), and perform a number of other computing and networking tasks. These devices may be installed in public locations such as airports, parks, and governmental facilities, or private locations such as businesses and retail locations. In many cases, the entity providing, operating, and maintaining a network of digital kiosks or other specialized devices may be separate from and unaffiliated with the entities that own and maintain the physical locations at which the digital kiosks or other specialized devices are installed. For instance, a digital kiosk system installed within a private retail location may be unaffiliated with the retail location, and might not have access to the network infrastructure or data stores of the retail location.

BRIEF SUMMARY

Aspects described herein relate to analyzing location-based transaction systems based on data from multiple client devices detected and received via multiple communication networks, and further relate to providing customized data to client devices associated with particular locations and/or users of the transaction system. Specifically, various techniques (e.g., systems, methods, computer-program products tangibly embodied in a non-transitory machine-readable storage medium, etc.) are described herein for determining the characteristics of a transaction system and/or specific client locations of the transaction system, based on data received from multiple client devices. In some embodiments, a back-end system may receive data from one or more digital kiosk systems associated with particular locations in a transaction system network. The back-end system may also receive data from various mobile computing devices of customers, and may receive transaction data from client computers within the transaction system. In some cases, the data received from the digital kiosk systems, mobile computing devices, and client computers may be received at different times and/or via different communication networks and protocols. One or more back-end servers may analyze the data to determine various characteristics of the transaction system and/or characteristics of one or more particular locations in the transaction system network.

Additional aspects described herein relate to techniques for correlating the data received from mobile computing devices with separate data received from digital kiosk systems and/or transaction data received from client terminals, in order to verify locations of client terminals and other characteristics of the transaction system. Further aspects described herein relate to determining and transmitting custom content to mobile computing devices and/or particular digital kiosks in the transaction system network, based on the determined system characteristics. Still additional aspects described herein relate to monitoring digital kiosks and/or mobile computing devices, and providing user messages, alerts, and notifications relating to the transaction system and/or particular locations in the network.

Figure 1:
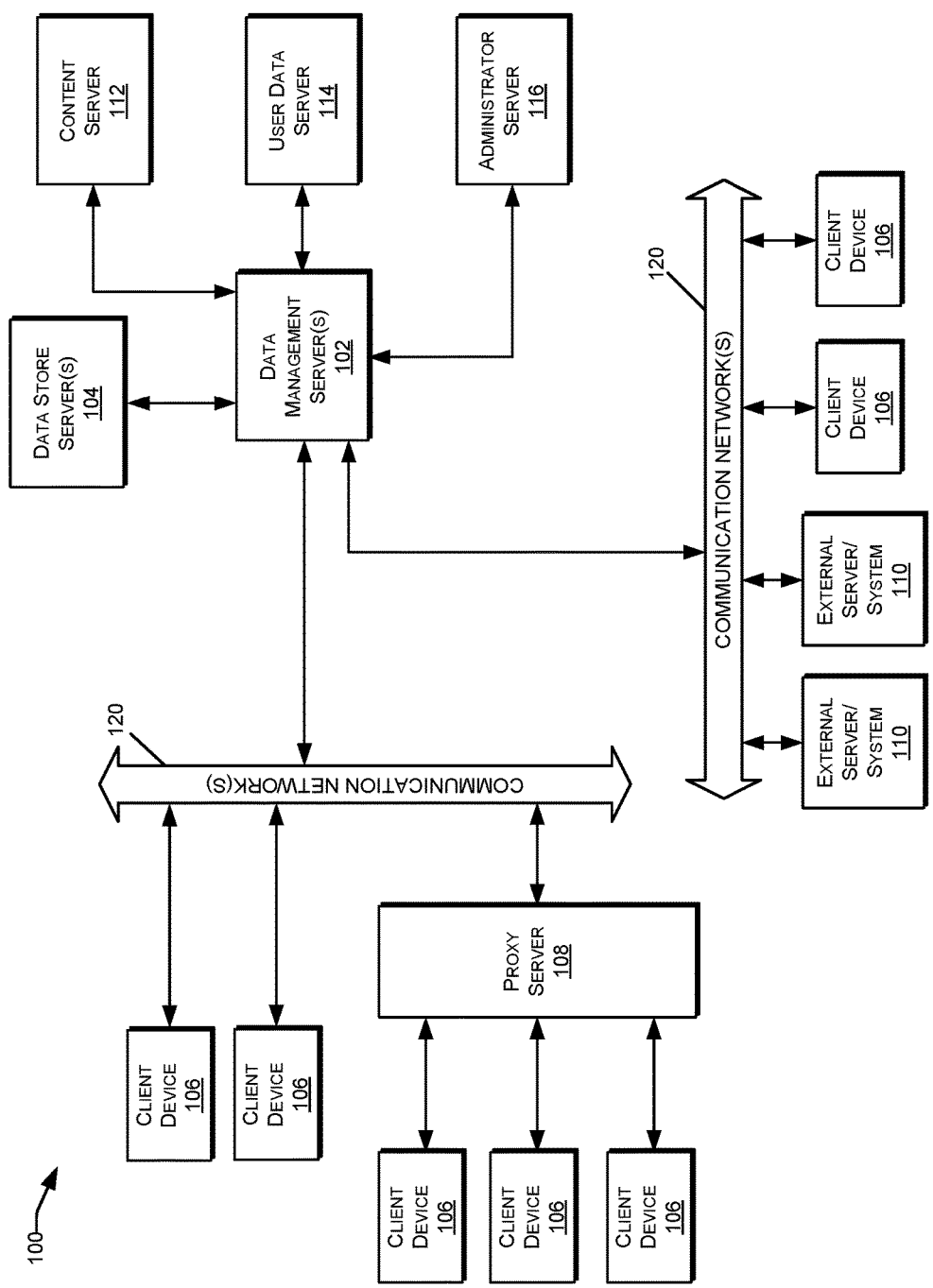
FIG. 1 is a block diagram illustrating an example of an electronic data transfer network, according to one or more embodiments of the disclosure.

It is noted that any of the elements and/or steps provided in the block diagrams, flow diagrams, method diagrams, and other illustrations of the figures may be optional, replaced, and/or include additional components, such as combined and/or replaced with other elements and/or steps from other figures and text provided herein. Various embodiments of the present invention are discussed below, and various combinations or modifications thereof may be contemplated.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Various techniques (e.g., systems, methods, computer-program products tangibly embodied in a non-transitory computer-readable storage medium, etc.) are described herein for analyzing location-based transaction systems based on data from multiple client devices detected and received via multiple communication networks, and further relate to providing customized data to client devices associated with particular locations and/or users of the transaction system. Specifically, various techniques are described herein for determining the characteristics of a transaction system and/or specific client locations of the transaction system, based on data received from multiple client devices. In some embodiments, a back-end system may receive data from one or more digital kiosk systems associated with particular locations in a transaction system network. The back-end system may also receive data from various mobile computing devices of customers, and may receive transaction data from client computers within the transaction system. In some cases, the data received from the digital kiosk systems, mobile computing devices, and client computers may be received at different times and/or via different communication networks and protocols. One or more back-end servers may analyze the data to determine various characteristics of the transaction system and/or characteristics of one or more particular locations in the transaction system network.

Additional techniques described herein relate to correlating the data received from mobile computing devices with separate data received from digital kiosk systems and/or transaction data received from client terminals, in order to verify locations of client terminals and other characteristics of the transaction system. Further techniques described herein relate to determining and transmitting custom content to mobile computing devices and/or particular digital kiosks in the transaction system network, based on the determined system characteristics. Still further techniques described herein relate to monitoring digital kiosks and/or mobile computing devices, and providing user messages, alerts, and notifications relating to the transaction system and/or particular locations in the network.

With reference now to FIG. 1, a block diagram is shown illustrating various components of an electronic data transfer network 100 which implements and supports certain embodiments and features described herein. As discussed below in more detail, various embodiments of electronic data transfer networks 100 may be implemented and configured to perform secure data transfers between client devices 106, system servers (e.g., 102), and/or external systems 110. In some embodiments, the various computing devices and systems shown in FIG. 1 may correspond to different physical or virtual domains/regions, for instance, different geographic areas within different jurisdictions, different data centers, different networks, different computing infrastructures, etc. As described herein, secure data transfers may include transfers of various different types of data items (e.g., files, database records, media or other content resources, etc.), as well as other secure data transactions or other interactions between a sender and receiver devices/servers. In some embodiments, the electronic transfer network 100 may be configured to operate as a value transfer system by which users at client devices 106 may initiate value transfers to users at other client devices 106. In such cases, management servers 102 and/or external systems 110 may correspond to secure systems operated by financial institutions or other entities, by which sender and receiver credentials and value transfer requests may be received and analyzed, and value-based transactions may be authorized and performed.

Thus, in various embodiments, electronic data transfer network 100 may be configured to support and perform transfers of various currency types, including traditional and/or digital currencies, centralized and/or de-centralized currencies, cryptocurrencies, and any other medium of exchange (e.g., credit, gift cards or certificates, points in a user point system, etc.), between client devices 106 and/or external systems 110 in different areas, regions, or jurisdictions. In other embodiments, the electronic transfer network 100 may be configured to perform other types of multi-party data transfers and/or secure transactions, such as transfers of data items including secure files, records, and/or content resources, between client devices 106 and other client devices 106, management servers 102 and/or external systems 110. For such transfers, the endpoint systems may be operating in the same location, using the same communication networks 120, and/or using the same computing hardware and software infrastructure, or may operate in different locations, on different networks, and/or in different datacenters, etc. Data management servers 102 and related servers (e.g., 104, 108, 112, 114, 116, etc.) in some embodiments, may correspond to authentication systems, data access/permission systems, subscription monitor systems, network access providers, and/or any other servers that may be used to monitor, permit/deny access, and/or enable data transfers.

In still other embodiments, network 100 may be implemented as part of interactive gaming systems, eCommerce systems, educational and professional training systems, and/or social networking systems, to enable the transfer of certain data or values (e.g., points, credits, resources, etc.) between users on different systems and/or in different locations.

As shown in FIG. 1, electronic data transfer network 100 may include one or more data management servers 102. Data management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Data management servers 102 may include one or more server farms, clusters, or any other appropriate arrangement and/or combination or computer servers. Data management servers 102 may act according to stored instructions located in a memory subsystem of the servers 102, and may run an operating system, including any commercially available server operating system and/or any other operating systems discussed herein.

The electronic transfer network 100 may include one or more data store servers 104, such as database servers and file-based storage systems. Data stores 104 may comprise stored data relevant to the functions of the electronic transfer network 100. Illustrative examples of data stores 104 that may be maintained in certain embodiments of the electronic transfer network 100 are described below in reference to FIG. 4. In some embodiments, multiple data stores may reside on a single server 104, either using the same storage components of server 104 or using different physical storage components to assure data security and integrity between data stores. In other embodiments, each data store may have a separate dedicated data store server 104.

Electronic data transfer network 100 also may include one or more client devices 106. Client devices 106 may display data received via the electronic data transfer network 100, and may support various types of user interactions with the data. Client devices 106 may include mobile computing devices such as smartphones, tablet computers, personal digital assistants, and wearable computing devices. Such mobile computing devices may run a variety of mobile operating systems, and may be enabled for Internet, e-mail, short message service (SMS), Bluetooth®, mobile radio-frequency identification (M-RFID), and/or other communication protocols. Other client devices 106 may be general purpose personal computers or special-purpose computing devices including, by way of example, personal computers, laptop computers, workstation computers, projection devices, and interactive room display systems. Additionally, client devices 106 may be any other electronic devices, such as thin-client computers, Internet-enabled gaming systems, business or home appliances, and/or personal messaging devices, capable of communicating over network(s) 120. In some embodiments, one or more client devices 106 may include digital kiosk devices such as point-of-sale terminals, value transfer terminals, and/or digital advertising or display devices, including some or all of the features described below in reference to FIG. 2.

In different contexts of electronic transfer networks 100, client devices 106 may correspond to different types of specialized devices, for example, employee devices and presentation devices in a company network, gaming devices in a gaming network, networked point-of-sale terminals, transaction performing or staging terminals, and/or digital advertising terminals in a retail network, etc. In some embodiments, client devices 106 may operate in the same physical location, such as the conference room or same retail store. In such cases, the devices 106 may contain components that support direct communications with other nearby devices 106, such as a wireless transceivers and wireless communications interfaces, Ethernet sockets or other Local Area Network (LAN) interfaces, etc. In other implementations, the client devices 106 need not operate at the same physical location, but may be used in remote geographic locations in which each client device 106 may use security features and/or specialized hardware (e.g., hardware-accelerated SSL and HTTPS, WS-Security, firewalls, etc.) to communicate with the data management server 102 and/or other remotely located client devices 106. Additionally, different client devices 106 may be assigned different designated roles, such as sender devices, receiver devices, administrator devices, or the like, and in such cases the different devices may be provided with additional hardware and/or software components to provide content and support user capabilities not available to the other devices.

The electronic data transfer network 100 also may include one or more proxy servers 108 configured to operate between a set of related client devices 106 and the back-end server(s) 102. In some cases, proxy server 108 may maintain private user information for client devices 106 interacting with applications or services hosted on other servers. For example, the proxy server 108 may be used to maintain private data of a user within one jurisdiction even though the user is accessing an application hosted on a server (e.g., the data management server 102) located outside the jurisdiction. In such cases, the proxy server 108 may intercept communications between multiple different client devices 106 and/or other devices that may include private user information. The proxy server 108 may create a token or identifier that does not disclose the private information and may use the token or identifier when communicating with the other servers and systems, instead of using the user's private information.

The electronic data transfer network 100 also may include one or more external servers/systems 110 configured to connect to the back-end server(s) 102 through various communication networks 120 and/or through proxy servers 108. External servers/systems 110 may include some or all of the same physical and logical components as the data management server(s) 102, and may be configured to provide various data sources and/or services to the other components of the electronic transfer network 100.

As illustrated in FIG. 1, the data management server 102 may be in communication with one or more additional servers, such as a content server 112, a user data server 112, and/or an administrator server 116. Each of these servers may include some or all of the same physical and logical components as the data management server(s) 102, and in some cases, the hardware and software components of these servers 112-116 may be incorporated into the data management server(s) 102, rather than being implemented as separate computer servers.

Content server 112 may include hardware and software components to generate, store, and maintain the content resources for distribution to client devices 106 and other devices in the network 100. For example, in electronic transfer networks 100 used for professional training and educational purposes, content server 112 may include data stores of digital content, training materials, presentations, interactive programs and simulations, and various user interfaces that correspond to different content and/or different types of user devices 106. In electronic data transfer networks 100 used for distribution of media content, advertising, and the like, a content server 112 may include media and advertising content files.

User data server 114 may include hardware and software components that store and process data for multiple users relating to each user's activities and usage of the electronic data transfer network 100. For example, the data management server 102 may record and track each user's system usage, including their client device 106, their transaction history, the data accessed and transferred by the user, and the user's interactions with other client devices 106. This data may be stored and processed by the user data server 114, to support user tracking and analysis features. For instance, in transaction system contexts, the user data server 114 may store and analyze each user's completed and attempted transactions (e.g., communication sessions, data transfers, eCommerce or financial transactions, etc.), as well as content requested, view, interactions with other devices/systems, and the like. In the context of professional training or educational content, advertising, media distribution, and interactive gaming, the user data server 114 may store and process resource access data for multiple users (e.g., data files accessed, access times, data usage amounts, user histories, user devices and device types, etc.).

Administrator server 116 may include hardware and software components to initiate various administrative functions at the data management server 102 and other components within the network 100. For example, the administrator server 116 may monitor device status and performance for the various servers, data stores, and/or client devices 106 in the electronic data transfer network 100. When necessary, the administrator server 116 may add or remove devices from the network 100, and perform device maintenance such as providing software updates to the devices in the network 100. Various administrative tools on the administrator server 116 may allow authorized users to set user access permissions to various data resources, monitor resource usage by users and devices 106, and perform analyses and generate reports on specific network users and/or devices (e.g., resource usage tracking reports, training evaluations, etc.).

The electronic data transfer network 100 may include one or more communication networks 120. Although two networks 120 are identified in FIG. 1, the electronic transfer network 100 may include any number of different communication networks between any of the computer servers and devices shown in FIG. 1 and/or other devices described herein. Communication networks 120 may enable communication between the various computing devices, servers, and other components of the electronic data transfer network 100. As discussed below, various implementations of electronic data transfer networks 100 may employ different types of networks 120, for example, computer networks, telecommunications networks (e.g., cellular), mobile wireless data networks, and any combination of these and/or other networks.

As noted above, in certain embodiments, electronic data transfer network 100 may be a cryptocurrency network or other network using encryption protocols and techniques for performing transfers of cryptocurrency and/or other alternative digital currencies. Illustrative and non-limiting examples of such cryptocurrency networks may include a bitcoin peer-to-peer (P2P) payment network, a Litecoin network, a Peercoin network, and various other private digital cryptocurrency networks. The various computing devices and servers in such cryptocurrency networks 100, including client devices 106, management servers 102, and/or external systems 110, may be configured to perform cryptocurrency transfers as senders and/or receivers. For example, a client device 106 may securely store a private cryptographic key associated with a cryptocurrency account of a user, and may use specialized client software (e.g., cryptocurrency wallet application) to generate digital cryptographic signatures using the private cryptographic key and data identifying the details of the requested cryptocurrency transfer. In some cases, the cryptocurrency client application may execute a cryptographic hash function to generate a hash value signature based on the private key value associated with the cryptocurrency account. Recipient client devices 106, as well as other servers/systems in the network 100, may use the public key of the sender to decrypt the cryptographic signature and verify the authenticity of the requested cryptocurrency transfer. Some or all of the client devices 106, servers 102, and/or external systems 110 may use databases or other secure storage to independently maintain and update electronic ledgers for tracking the current balances associated with cryptocurrency accounts.

In some embodiments, certain computing devices and servers in a cryptocurrency network 100 may function as miner systems that are configured to perform complex mathematical operations in order to produce new cryptocurrency. Thus, various client devices 106, servers 102, and/or external systems 110 may be implemented as cryptocurrency miners. In some cases, these devices/systems may include specialized hardware and software designed for cryptocurrency mining, such as application-specific integrated circuits (ASICs) that are specifically designed and configured for cryptocurrency mining and/or specialized cryptocurrency mining software. In some cases, specialized cryptocurrency mining software may be used to allow collaboration between multiple different devices/systems which may function as a mining pool.

In some embodiments, various computing devices and servers in a cryptocurrency network 100 may be configured to collaboratively generate and store universal public ledgers and/or transaction chains for the cryptocurrency network 100. For example, computing devices and systems within the cryptocurrency network 100 may be configured to retrieve individual cryptocurrency transactions from a pool, and resolve the transactions by solving associated mathematical problems such as cryptographic hashes. After the problem is solved, the associated cryptocurrency transaction may be added to a universal transaction chain which is shared by other devices and systems of the cryptocurrency network 100. Each device/system in the cryptocurrency network 100 may independent maintain a copy of the transaction chain, and may periodically (or upon request from other systems) share their copy of the transaction chain in order to synchronize and reconcile different versions.

In some embodiments, a transaction chain for a cryptocurrency system/network may be stored in a distributed database by multiple different data nodes at different devices/servers within the network 100. For example, blockchain technology may be used to implement a decentralized distributed database which may be hosted by a combination of client devices 106, data management servers 102, and/or external systems 110. The blockchain (or other decentralized storage system) may store a distributed electronic ledger and/or universal transaction chain for the cryptocurrency network 100. The blockchain may be accessed by individual client software (e.g., wallet applications) of client devices 106, which may propose a cryptocurrency value transfer to be added to the blockchain. After analyzing and authorizing the requested transfer (e.g., by confirming that there is sufficient cryptocurrency value in the sender's account), a miner node within the cryptocurrency network 100 may bundle the transfer with other transactions to create a new block to be added to the blockchain. In some cases, adding blocks to the blockchain may involve miner nodes repeatedly executing cryptographic hash functions, ensuring that the blockchain cannot be tampered with by any malicious systems within the network 100.

As noted above, the client devices 106 in the electronic transfer network 100 may include various mobile computing devices, such as smartphones, tablet computers, personal digital assistants, wearable computing devices, bodily implanted communication devices, vehicle-based devices, etc. Within an electronic data transfer network 100, mobile computing devices 106 may be configured to support mobile payment and/or mobile money transfer functionality. Such mobile devices 106 may initiate and receive communications via the Internet, e-mail, short message service (SMS), Bluetooth®, mobile radio-frequency identification (M-RFID), near-field communication (NFC) and/or various other communication protocols. In some cases, mobile devices 106 may execute a mobile wallet application to store user data and support secure data and/or value transfers via various different techniques, for example, SMS-based transactional payments, direct mobile billing, Web Application Protocol mobile payments, and NFC-based payments.

In some examples, the electronic data transfer network 100 shown in FIG. 1 may correspond to an interactive user platform, such as a social networking platform or messaging platform. In such cases, an electronic transfer technology platform may be integrated within the social networking and/or messaging platform 100, in order to provide interactive users with the capabilities to perform quick and convenient value transfers with other users anywhere in the world. Such embodiments may apply to various different collaborative user platforms and applications, including social media applications, email applications, chat and messaging applications, online gaming applications, and the like. These applications may be executed on client devices 106 and may transmit communications to and/or establish communication sessions with corresponding applications on other client devices 106 and/or external systems 110. In some embodiments, the secure data and/or value transfer capabilities of one or more transfer services providers may be embedded into various collaborative user platforms. For example, from within a social networking or messaging application running on client device 106, a user may be able to request and fund value transfers utilizing a debit card, credit card, or bank account, and easily direct the funds to another user on the same collaborative platform, or to retail agent location and/or to a mobile wallet or bank account. Integration of secure value transfer technologies within social networking applications, messaging applications, and the like, may provide a cross-border platform for transfer services that enables pay-in and pay-out capabilities that leverage technology, foreign exchange conversion, data management, as well as regulatory, compliance and anti-money laundering (AML) infrastructure of the transfer service provider, to expedite efficient and timely transfers. In such cases, the technology platform used to support secure data and/or value transfers within the network 100 may be accessible to messaging, social, and other digital networks, and may offer a suite of APIs built on a highly scalable infrastructure, enabling fast deployment of domestic and cross-border remittance capabilities.

Figure 2:
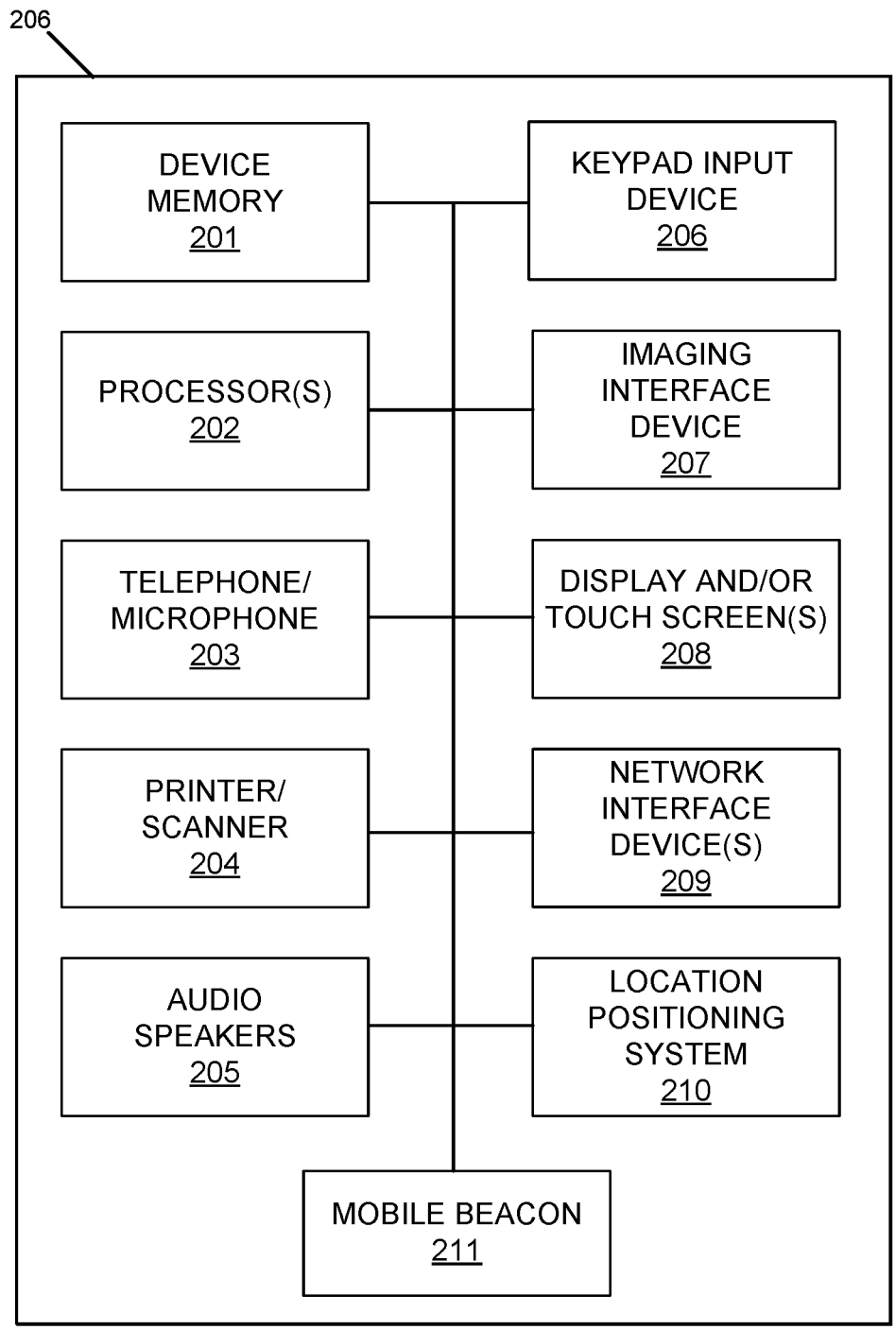
FIG. 2 is a block diagram illustrating various components and features of a digital kiosk client device, according to one or more embodiments of the disclosure.

Referring now to FIG. 2, a simplified block diagram is illustrating showing a digital kiosk system 206. In some embodiments, digital kiosk systems 206 may be another example of client devices 106. The digital kiosk 206 may be implemented, for example, as a kiosk in a retail store or other location, a value transfer terminal for performing value transfers (e.g., transfers of money and other assets, submitting payments to payees, etc.), a point-of-sale terminal, an electronic advertising system, and/or other various electronic display systems. The digital kiosk device 206 may be operated by a user (e.g., customer, shopper), and/or by agent, employee, or representative of a business providing or operating the kiosk 206. In various embodiments, the digital kiosk device 206 may include one or more of: a memory system 210, a processing unit 211, a telephone/microphone I/O component system 212, a printer/scanner I/O component system 213, an audio speaker system 214, a keypad input device 215, an imaging interface device 216, one or more digital display screens 217, one or more network interface devices 218 (e.g., network interface controllers, RF transceivers, etc.), a digital positioning system 219 (e.g., Global Positioning System (GPS) receiver device), and/or a mobile beacon device 220.

In some embodiments, digital kiosk devices 206 may include a touch screen that functions as the display screen 217 and/or the keypad 215. The keypad 215 may instead be any device that accepts user input, such as a trackball, mouse, or joystick. The imaging interface device 216 may serve to allow the digital kiosk device 206 to communicate with an imaging device. Alternatively, an imaging device may be directly incorporated into the digital kiosk device 206. Speakers 214 may be any audio output device. The printer 213 may be used to provide the user a receipt, point-of-sale information (e.g., product information, order confirmation, etc.), coupon, advertisement, or other information to be taken with the user, and scanner 213 may be used to scan a QR Code or barcode identifying a user or transaction, transfer request, user identification card, coupon, or the like. In some embodiments, a telephone/microphone 212 may be used in conjunction with speakers 214 to interact with the digital kiosk device 206, or a remotely located user (e.g., counterpart user in a transaction, customer representative, etc.) when performing a transfer or requesting information.

Digital kiosks 206 may include various different types of positioning systems 219 (or geo-location systems 219), such as a Global Positioning System (GPS) receiver, so that kiosk location data may be collected and transmitted to data management servers 102 and/or other client devices 106. In some cases, such kiosk location data may be used to determine which content a specific digital kiosk device 206 is permitted to receive (e.g., based on domain/jurisdiction), and also may be used to determine factors such as language, data availability, network availability, product availability, and the like.

Additionally, certain digital kiosks 206 may include one or more mobile beacon 220. Mobile beacon 220 may be configured to communicate with various mobile computing devices 106 (e.g., mobile phones, tablet computers, wearable computers, etc.) that are detected near the mobile beacon 220. Mobile beacon 220 may one or more short-range wireless technologies to detect and communicate with nearby mobile devices 106, for example, RFID and/or Bluetooth low-energy (BLE) wireless technology. For instance, mobile beacon 220 may transmit a BLE signal that may be detected by a particular mobile application installed on a mobile device 106. In some cases, authentication and user permission for the communication link may be obtained via the particular mobile application on the user's device, after which the mobile beacon 220 and the nearby device may communicate to identify the user's location with respect to the mobile beacon 220 (e.g., the user's precise location within a retail store), and to transmit targeted content from the mobile beacon 220 to the user's mobile device 106.

Figure 3:
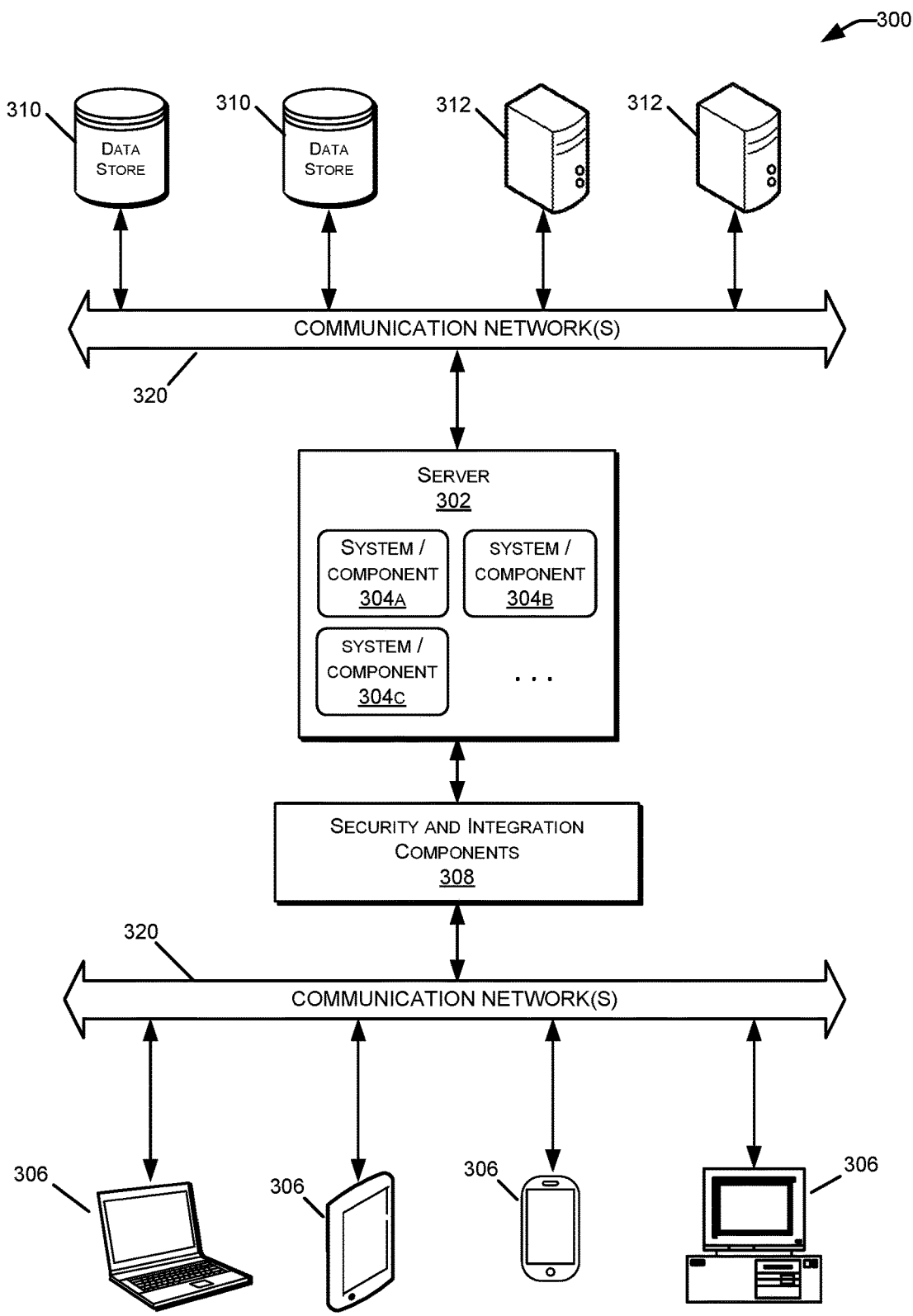
FIG. 3 is a block diagram illustrating a computer server and computing environment within an electronic data transfer network, according to one or more embodiments of the disclosure.

With reference to FIG. 3, an illustrative distributed computing environment 300 is shown including a computer server 302, four client computing devices 306, and other components that may implement certain embodiments and features described herein. In some embodiments, the server 302 may correspond to the data management server 102 discussed above in FIG. 1, and the client computing devices 306 may correspond to the client devices 106 (e.g., client terminals, mobile computing devices, etc.) and/or digital kiosk systems 206. However, the computing environment 300 illustrated in FIG. 3 also may correspond to any other combination of devices and servers configured to implement a client-server model or other distributed computing architecture.

Client devices 306 may be configured to receive and execute client applications over one or more networks 320. Such client applications may be web browser based applications and/or standalone software applications, such as mobile device applications. Server 302 may be communicatively coupled with the client devices 306 via one or more communication networks 320. Client devices 306 may receive client applications from server 302 or from other application providers (e.g., public or private application stores). Server 302 may be configured to run one or more server software applications or services, for example, web-based or cloud-based services, to support content distribution and interaction with client devices 306. Users operating client devices 306 may in turn utilize one or more client applications (e.g., virtual client applications) to interact with server 302 to utilize the services provided by these components.

Various different subsystems and/or components 304 may be implemented on server 302. Users operating the client devices 306 may initiate one or more client applications to use services provided by these subsystems and components. The subsystems and components within the server 302 and client devices 306 may be implemented in hardware, firmware, software, or combinations thereof. Various different system configurations are possible in different distributed computing systems 300 and electronic transfer networks 100. The embodiment shown in FIG. 3 is thus one example of a distributed computing system and is not intended to be limiting.

Although exemplary computing environment 300 is shown with four client computing devices 306, any number of client computing devices may be supported. Such client devices 306 may include digital kiosk devices including some or all of the features described below in reference to FIG. 2. Other devices, such as specialized sensor devices, etc., may interact with client devices 306 and/or server 302.

As shown in FIG. 3, various security and integration components 308 may be used to send and manage communications between the server 302 and user devices 306 over one or more communication networks 320. The security and integration components 308 may include separate servers, such as web servers and/or authentication servers, and/or specialized networking components, such as firewalls, routers, gateways, load balancers, and the like. In some cases, the security and integration components 308 may correspond to a set of dedicated hardware and/or software operating at the same physical location and under the control of same entities as server 302. For example, components 308 may include one or more dedicated web servers and network hardware in a datacenter or a cloud infrastructure. In other examples, the security and integration components 308 may correspond to separate hardware and software components which may be operated at a separate physical location and/or by a separate entity.

Security and integration components 308 may implement various security features for data transmission and storage, such as authenticating users and restricting access to unknown or unauthorized users. In various implementations, security and integration components 308 may provide, for example, a file-based integration scheme or a service-based integration scheme for transmitting data between the various devices in the electronic transfer network 100. Security and integration components 308 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 308 and/or elsewhere within the electronic data transfer network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 302 and client devices 306. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 308 may include specialized hardware for providing secure web services. For example, security and integration components 308 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 320 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 320 may be local area networks (LAN), such as one based on Ethernet, Token-Ring and/or the like. Network(s) 320 also may be wide-area networks, such as the Internet. Networks 320 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 320.

Computing environment 300 also may include one or more data stores 310 and/or back-end servers 312. In certain examples, the data stores 310 may correspond to data store server(s) 104 discussed above in FIG. 1, and back-end servers 312 may correspond to the various back-end servers 110-116. Data stores 310 and servers 312 may reside in the same datacenter or may operate at a remote location from server 302. In some cases, one or more data stores 310 may reside on a non-transitory storage medium within the server 302. Other data stores 310 and back-end servers 312 may be remote from server 302 and configured to communicate with server 302 via one or more networks 320. In certain embodiments, data stores 310 and back-end servers 312 may reside in a storage-area network (SAN), or may use a storage-as-a-service (STaaS) architectural model.

Figure 4:
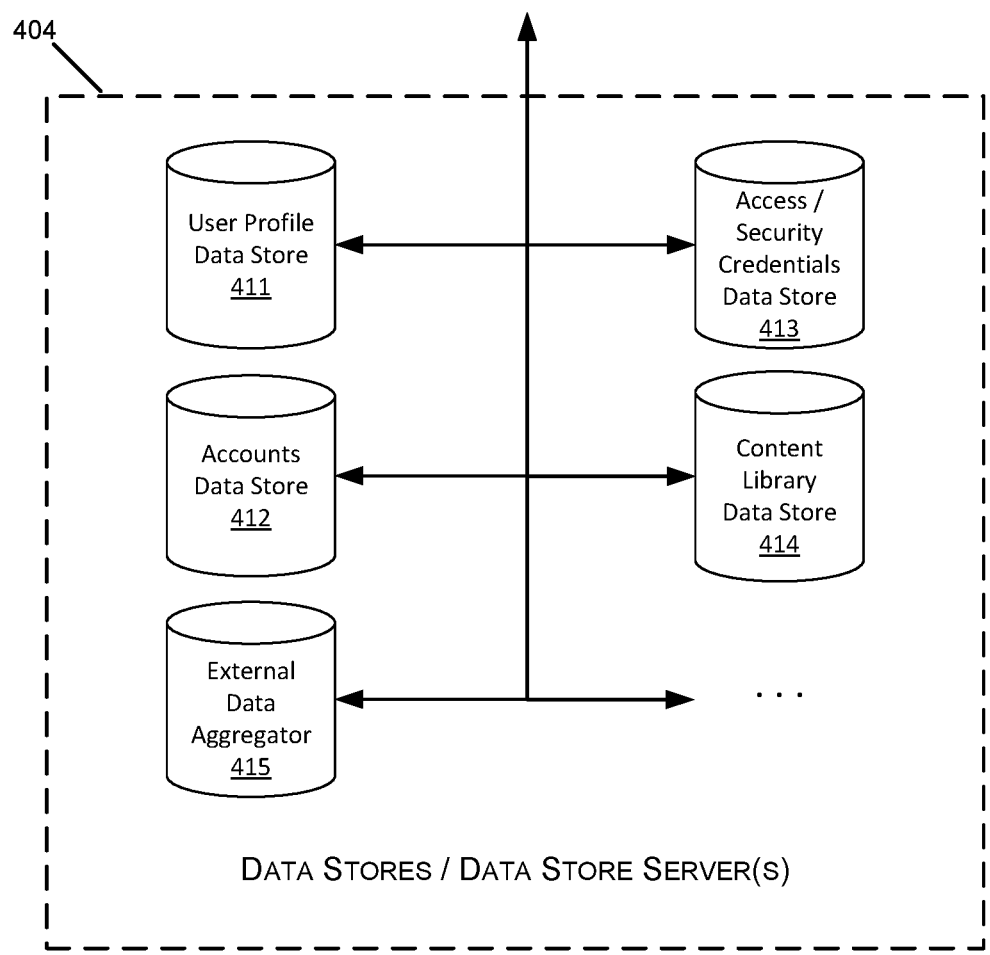
FIG. 4 is a block diagram illustrating an embodiment of one or more data store servers within an electronic data transfer network, according to one or more embodiments of the disclosure.

With reference to FIG. 4, an illustrative set of data stores and/or data store servers is shown, corresponding to the data store servers 104 of the electronic data transfer network 100 discussed above in FIG. 1. One or more individual data stores 411-415 may reside in storage on a single computer server 104 (or a single server farm or cluster) under the control of a single entity, or may reside on separate servers operated by different entities and/or at remote locations. In some embodiments, data stores 411-415 may be accessed by the data management server 102 and/or other devices and servers within the network 100 (e.g., client devices 106, external systems 110, administrator servers 116, etc.). Access to one or more of the data stores 411-415 may be limited or denied based on the processes, user credentials, and/or devices attempting to interact with the data store.

The paragraphs below describe examples of specific data stores that may be implemented within some embodiments of an electronic data transfer network 100. It should be understood that the below descriptions of data stores 411-415, including their functionality and types of data stored therein, are illustrative and non-limiting. Data stores server architecture, design, and the execution of specific data stores 411-415 may depend on the context, size, and functional requirements of an electronic data transfer network 100. For example, in electronic data transfer systems 100 used to provide electronic advertising or other content from content providers to client devices 106, separate data stores may be implemented in data stores server(s) 104 to store listings of available content and descriptions, content usage statistics, client device profiles, account data, network usage statistics, etc. In electronic data transfer systems 100 used to support location-based transaction systems with client terminals, kiosks, and mobile devices, separate data stores may be implemented in data stores server(s) 104 to store transaction data, user data, location data, device interaction data, etc. As another example, for electronic data transfer systems 100 used for educational or professional training client-server systems, separate databases or file-based storage systems may be implemented in data store server(s) 104 to store trainee and/or trainer data, training module data and content descriptions, training results, evaluation data, and the like.

A user profile data store 411 may include information relating to the end users within the electronic data transfer network 100. This information may include user characteristics such as the user names, access credentials (e.g., logins and passwords), user preferences, and information relating to any previous user interactions within the electronic transfer network 100 (e.g., requested data, provided data, system usage data/statistics, associated users, etc.).

An accounts data store 412 may generate and store account data for different users in various roles within the electronic data transfer network 100. For example, accounts may be created in an accounts data store 412 for individual end users, administrator users, and external entities such as businesses, governmental or educational institutions. Account data may include account types, current account status, account characteristics, and any parameters, limits, restrictions associated with the accounts.

A content/security credential data store 413 may include access rights and security information for the electronic data transfer network 100 and specific files/content resources. For example, the content/security credential data store 413 may include login information (e.g., user identifiers, logins, passwords, etc.) that can be verified during login attempts by users and/or client devices 106 to the network 100. The content/security credential data store 413 also may be used to store assigned user roles and/or user levels of access. For example, a user's access level may correspond to the sets of data and/or the client or server applications that the user is permitted to access. Certain users and/or client devices may be permitted or denied access to certain applications and resources based on their access level, subscription level, etc. Certain users and/or client devices 106 may have supervisory access over one or more end users accounts and/or other client devices 106, allowing the supervisor to access all or portions of the user's content access, activities, etc. Additionally, certain users and/or client devices 106 may have administrative access over some users and/or some applications in the electronic data transfer network 100, allowing such users to add and remove user accounts, modify user access permissions, perform maintenance updates on software and servers, etc.

A content library data store 414 may include information describing the individual data items (or resources) available via the electronic data transfer network 100. In some embodiments, the content data store 414 may include metadata, properties, and other characteristics associated with the data items stored in the content server 112. Such data may identify one or more aspects or attributes of the associated data items, for example, subject matter or access level of the content resources, license attributes of the data items (e.g., any limitations and/or restrictions on the licensable use and/or distribution of the data items), price attributes of the data items (e.g., a price and/or price structure for determining a payment amount for use or distribution of the data items), language and geographic associations with the data items, and the like. In some embodiments, the content data store 414 may be configured to allow updating of data item metadata or properties, and to allow the addition and/or removal of information relating to the data items. For example, item relationships may be implemented as graph structures, which may be stored in the content data store 414 or in an additional data store for use by selection algorithms along with the other metadata.

In addition to the illustrative data stores described above, data store server(s) 104 (e.g., database servers, file-based storage servers, etc.) may include one or more external data aggregators 415. External data aggregators 415 may include third-party data sources accessible to the electronic data transfer network 100, but not maintained by the electronic data transfer network 100. External data aggregators 415 may include any electronic information source relating to the users, data items, or applications of the electronic data transfer network 100. For example, external data aggregators 415 may be third-party data stores containing demographic data, education related data, financial data, consumer sales data, health related data, and the like. Illustrative external data aggregators 415 may include, for example, social networking web servers, public records data stores, educational institution servers, business servers, consumer retail sales data stores, medical record data stores, etc. Data retrieved from various external data aggregators 415 may be used to verify and update user account information, suggest or select user content, and perform user and content evaluations. In some cases, external data aggregators 415 may correspond to external servers/systems 110.

Figure 5:
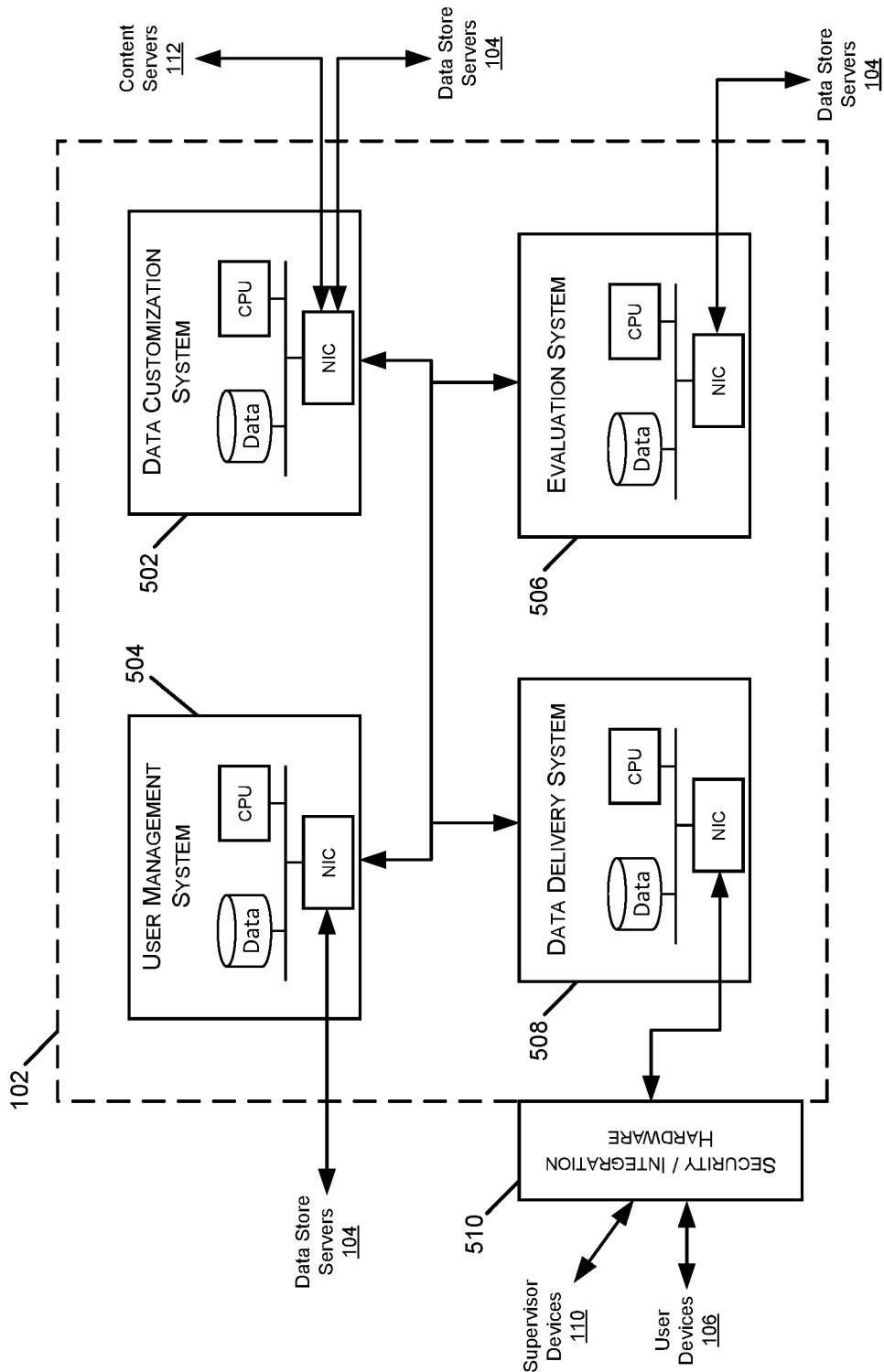
FIG. 5 is a block diagram illustrating an embodiment of one or more content management servers within an electronic data transfer network, according to one or more embodiments of the disclosure.

With reference now to FIG. 5, a block diagram is shown illustrating an embodiment of one or more data management servers 102 within an electronic data transfer network 100. As discussed above, data management server(s) 102 may include various server hardware and software components that manage the content resources within the electronic data transfer network 100 and provide interactive and adaptive content to users on various client devices 106. For example, data management server(s) 102 may provide instructions to and receive information from the other devices within the electronic data transfer network 100, in order to manage and transmit data resources, user data, and server or client applications executing within the network 100.

A data management server 102 may include a data customization system 502. The data customization system 502 may be implemented using dedicated hardware within the electronic data transfer network 100 (e.g., a data customization server 502), or using designated hardware and software resources within a shared data management server 102. In some embodiments, the data customization system 502 may adjust the selection and adaptive capabilities of data resources to match the needs and desires of the users and/or client devices 106 receiving the content. For example, the data customization system 502 may query various data stores and servers 104 to retrieve user information, such as user preferences and characteristics (e.g., from a user profile data store 411), location/geographic information associated with users and/or client devices 106, user access restrictions to data recourses (e.g., from an access credential data store 413), previous user activity within the network 100, and the like. Based on the retrieved information from data stores 104 and other data sources, the data customization system 502 may modify content resources for individual users and/or individual client devices 106.

A data management server 102 also may include a user management system 504. The user management system 504 may be implemented using dedicated hardware within the electronic data transfer network 100 (e.g., a user management server 504), or using designated hardware and software resources within a shared data management server 102. In some embodiments, the user management system 504 may monitor the activities of users and/or user devices 106 with respect to various data resources. For example, the user management system 504 may query one or more databases and/or data store servers 104 to retrieve user data such as associated data resources, access and completion status, results, and the like.

A data management server 102 also may include an evaluation system 506. The evaluation system 506 may be implemented using dedicated hardware within the electronic data transfer network 100 (e.g., an evaluation server 506), or using designated hardware and software resources within a shared data management server 102. The evaluation system 506 may be configured to receive and analyze information from client devices 106. For example, various data received by users via client devices 106 may be compiled and analyzed, and then stored in a data store 104 associated with the user and/or data item. In some embodiments, the evaluation server 506 may analyze the information to determine the effectiveness or appropriateness of data resources with a user or user group, for example, based on subject matter, age group, skill level, or the like. In some embodiments, the evaluation system 506 may provide updates to the data customization system 502 or the user management system 504, with the attributes of one or more data resources or groups of resources within the network 100.

A data management server 102 also may include a data delivery system 508. The data delivery system 508 may be implemented using dedicated hardware within the electronic data transfer network 100 (e.g., a data delivery server 508), or using designated hardware and software resources within a shared data management server 102. The data delivery system 508 may receive data from the data customization system 502 and/or from the user management system 504, and transmit the resources to client devices 106. In some embodiments, the data delivery system 508 may determine the appropriate presentation format for the data resources based on the user characteristics and preferences, and/or the device capabilities of client devices 106. If needed, the data delivery system 508 may convert the content resources to the appropriate presentation format and/or compress the content before transmission. In some embodiments, the data delivery system 508 may also determine the appropriate transmission media and communication protocols for transmission of the data to and from client devices 106.

In some embodiments, the data delivery system 508 may include specialized security and integration hardware 510, along with corresponding software components to implement the appropriate security features for data transmission and storage, to provide the supported network and client access models, and to support the performance and scalability requirements of the network 100. The security and integration layer 510 may include some or all of the security and integration components 308 discussed above in FIG. 3, and may control the transmission of data, as well as the receipt of requests, and data interactions to and from the client devices 106, external servers 110, administrative servers 116, and other devices in the network 100.

Figure 6:
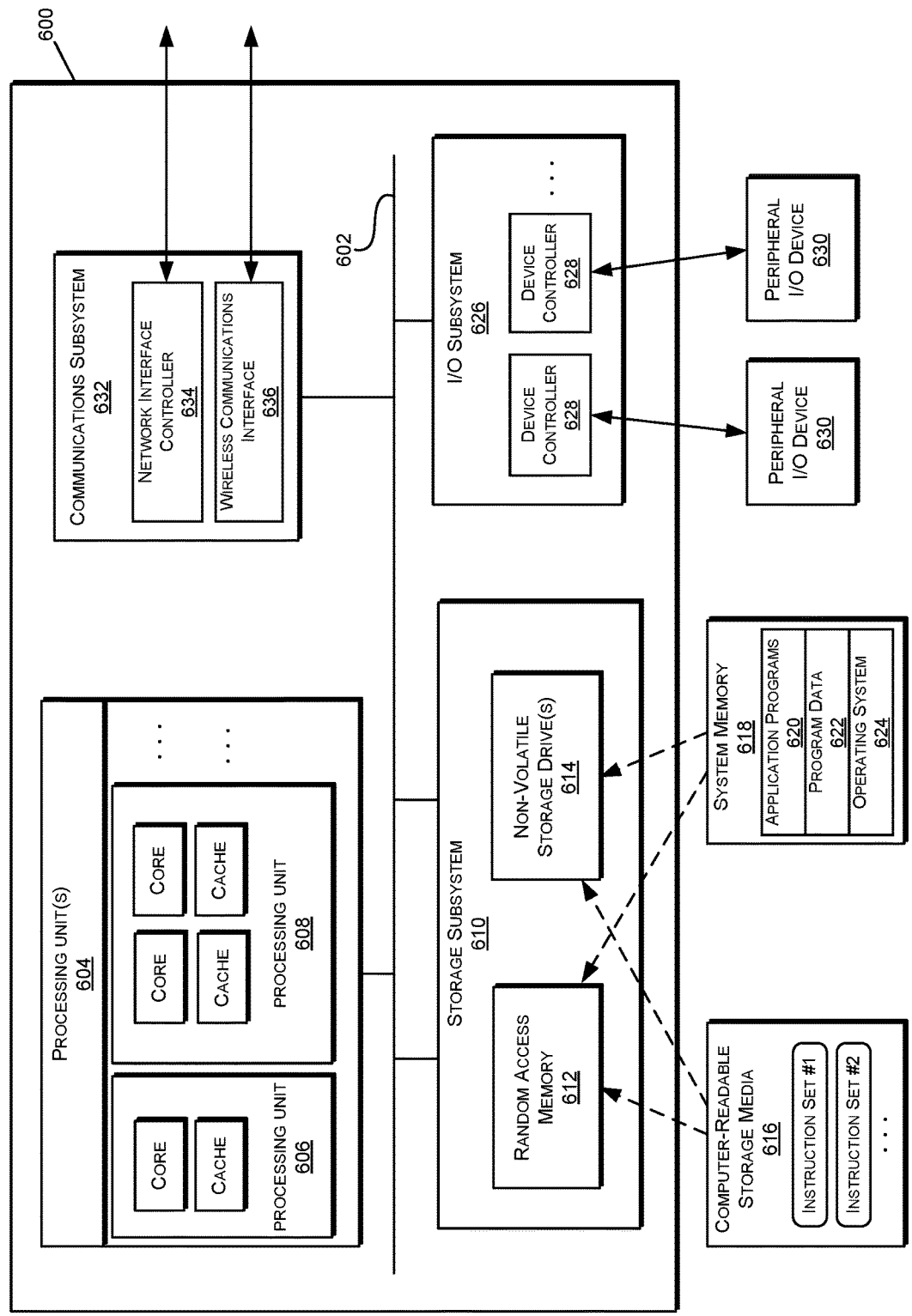
FIG. 6 is a block diagram illustrating the physical and logical components of a special-purpose computing device within an electronic data transfer network, according to one or more embodiments of the disclosure.

With reference now to FIG. 6, a block diagram of an illustrative computer system is shown. The system 600 may correspond to any of the computing devices or servers of the electronic data transfer network 100 described above, or any other computing devices described herein. In this example, computer system 600 includes processing units 604 that communicate with a number of peripheral subsystems via a bus subsystem 602. These peripheral subsystems include, for example, a storage subsystem 610, an I/O subsystem 626, and a communications subsystem 632.

Bus subsystem 602 provides a mechanism for letting the various components and subsystems of computer system 600 communicate with each other as intended. Although bus subsystem 602 is shown schematically as a single bus, alternative embodiments of the bus subsystem may utilize multiple buses. Bus subsystem 602 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 604, which may be implemented as one or more integrated circuits (e.g., a conventional microprocessor or microcontroller), controls the operation of computer system 600. One or more processors, including single core and/or multicore processors, may be included in processing unit 604. As shown in FIG. 6, processing unit 604 may be implemented as one or more independent processing units 606 and/or 608 with single or multicore processors and processor caches included in each processing unit. In other embodiments, processing unit 604 may also be implemented as a quad-core processing unit or larger multicore designs (e.g., hexa-core processors, octo-core processors, ten-core processors, or greater. As discussed above, in some cases, processing unit 604 may include one or more specialized ASICs designed and configured for cryptocurrency mining and/or specialized cryptographic hardware for handling cryptocurrency transactions.

Processing unit 604 may execute a variety of software processes embodied in program code, and may maintain multiple concurrently executing programs or processes. At any given time, some or all of the program code to be executed can be resident in processor(s) 604 and/or in storage subsystem 610. In some embodiments, computer system 600 may include one or more specialized processors, such as digital signal processors (DSPs), outboard processors, graphics processors, application-specific processors, and/or the like.

I/O subsystem 626 may include device controllers 628 for one or more user interface input devices and/or user interface output devices 630. User interface input and output devices 630 may be integral with the computer system 600 (e.g., integrated audio/video systems, and/or touchscreen displays), or may be separate peripheral devices which are attachable/detachable from the computer system 600.

Input devices 630 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 630 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 630 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 630 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 600 to a user or other computer. For example, output devices 630 may include, without limitation, a variety of display devices that visually convey text, graphics and audio/video information such as monitors, printers, speakers, headphones, automotive navigation systems, plotters, voice output devices, and modems.

Computer system 600 may comprise one or more storage subsystems 610, comprising hardware and software components used for storing data and program instructions, such as system memory 618 and computer-readable storage media 616. The system memory 618 and/or computer-readable storage media 616 may store program instructions that are loadable and executable on processing units 604, as well as data generated during the execution of these programs.

Depending on the configuration and type of computer system 600, system memory 618 may be stored in volatile memory (such as random access memory (RAM) 612) and/or in non-volatile storage drives 614 (such as read-only memory (ROM), flash memory, etc.) The RAM 612 may contain data and/or program modules that are immediately accessible to and/or presently being operated and executed by processing units 604. In some implementations, system memory 618 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the non-volatile storage drives 614. By way of example, and not limitation, system memory 618 may include application programs 620, such as client applications, Web browsers, mid-tier applications, server applications, etc., program data 622, and an operating system 624.

Storage subsystem 610 also may provide one or more tangible computer-readable storage media 616 for storing the basic programming and data constructs that provide the functionality of some embodiments. Software (programs, code modules, instructions) that when executed by a processor provide the functionality described herein may be stored in storage subsystem 610. These software modules or instructions may be executed by processing units 604. Storage subsystem 610 may also provide a repository for storing data used in accordance with the present invention.

Storage subsystem 610 may also include a computer-readable storage media reader that can further be connected to computer-readable storage media 616. Together and, optionally, in combination with system memory 618, computer-readable storage media 616 may comprehensively represent remote, local, fixed, and/or removable storage devices plus storage media for temporarily and/or more permanently containing, storing, transmitting, and retrieving computer-readable information.

Computer-readable storage media 616 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 600.

By way of example, computer-readable storage media 616 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 616 may include, but is not limited to, Zip® drives, flash memory cards, universal serial bus (USB) flash drives, secure digital (SD) cards, DVD disks, digital video tape, and the like. Computer-readable storage media 616 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 632 may provide a communication interface from computer system 600 and external computing devices via one or more communication networks, including local area networks (LANs), wide area networks (WANs) (e.g., the Internet), and various wireless telecommunications networks. The communications subsystem 632 may include, for example, one or more network interface controllers (NICs) 634, such as Ethernet cards, Asynchronous Transfer Mode NICs, Token Ring NICs, and the like, as well as one or more wireless communications interfaces 636, such as wireless network interface controllers (WNICs), wireless network adapters, and the like. Additionally and/or alternatively, the communications subsystem 632 may include one or more modems (telephone, satellite, cable, ISDN), synchronous or asynchronous digital subscriber line (DSL) units, FireWire® interfaces, USB® interfaces, and the like. Communications subsystem 636 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 632 may be detachable components coupled to the computer system 600 via a computer network, a FireWire® bus, or the like, and/or may be physically integrated onto a motherboard of the computer system 600. Communications subsystem 632 also may be implemented in whole or in part by software.

In some embodiments, communications subsystem 632 may also receive input communication in the form of structured and/or unstructured data feeds, event streams, event updates, and the like, on behalf of one or more users who may use or access computer system 600. For example, communications subsystem 632 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 632 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 632 may output such structured and/or unstructured data feeds, event streams, event updates, and the like to one or more data stores 104 that may be in communication with one or more streaming data source computers coupled to computer system 600.

Due to the ever-changing nature of computers and networks, the description of computer system 600 depicted in FIG. 6 is intended only as a specific example. Many other configurations having more or fewer components than the system depicted in FIG. 6 are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 7:
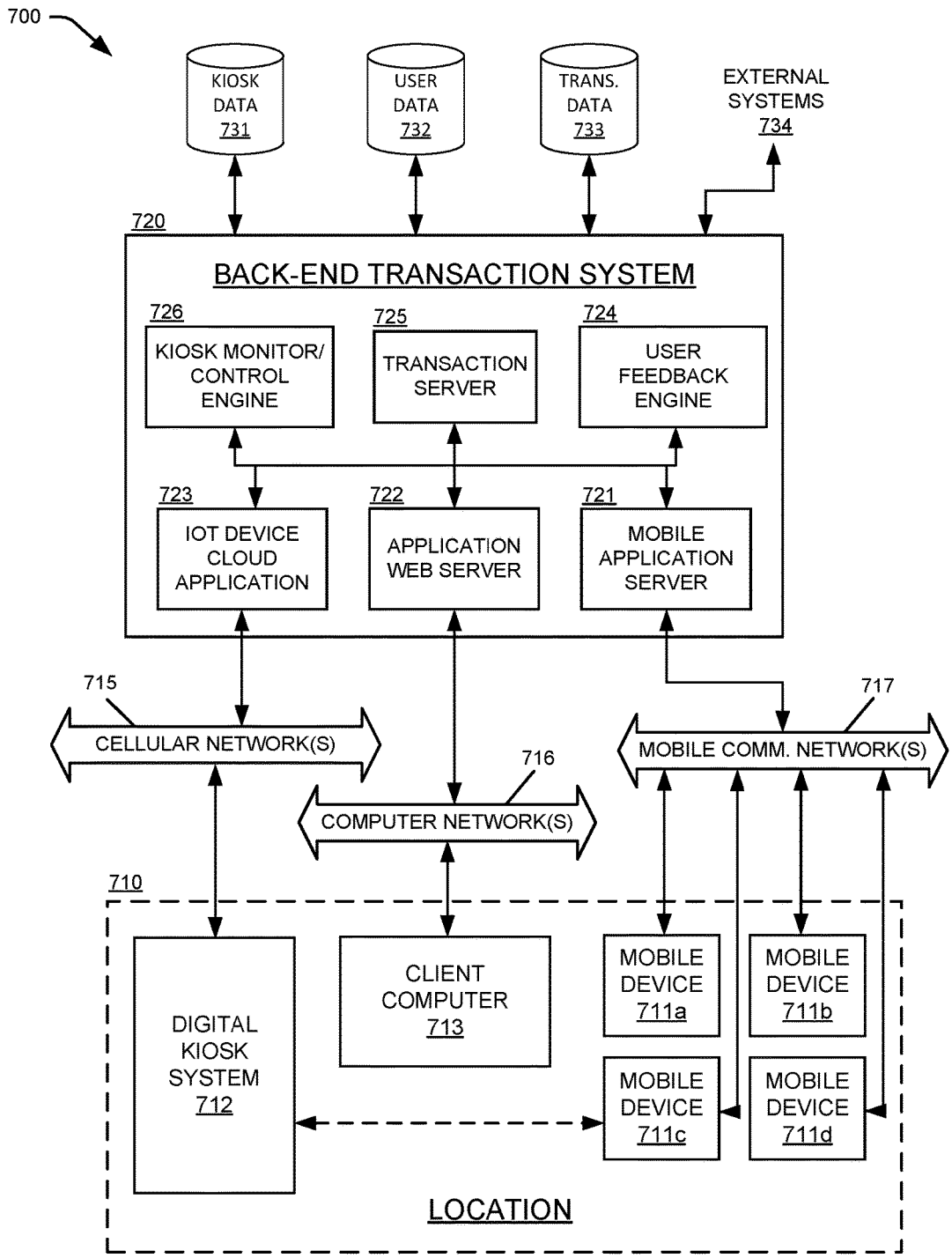
FIG. 7 is a block diagram illustrating an example transaction system including a back-end transaction system and a plurality of devices at a remote location, according to one or more embodiments of the disclosure.

With reference now to FIG. 7, a block diagram is shown illustrating an example transaction system 700 including a back-end transaction system 720 and a plurality of devices operating at or near a remote location 710. In this example, the back-end system 720 includes a number of subsystems 721-726 (e.g., servers, processing engines, applications, etc.) configured to process transactions and analyze data received from client devices 711-713 at one or more locations 710. The location 710 in this example includes a plurality of mobile devices 711a-711d, a digital kiosk system 712, and a client computer (or client terminal) 713 of the transaction system. As discussed below in more detail, transaction system 700 and similar systems may be used to detect and determine certain characteristics of the transaction system 700 and/or individual client locations 710. Additionally, transaction system 700 and similar systems may be used to generate and transmit customized content to mobile computing devices 710, and/or to digital kiosk systems 712, based on the determined system characteristics, as well as other features described below.

Location 710 may refer to a physical location such as a retail store location, a private business or residence, or public location such as a park, a shopping center, an airport terminal, train station, etc. In other cases, a location 710 may refer to only a portion of a physical location encompassed by a short-range wireless network. A location 710 may include client computer 713 (or client terminal) configured to allow users to initiate transactions within the transaction system 700. For instance, client computer 713 may be an automated teller machine, self-service terminal, or an Internet-connected computer running client software (e.g., a web browser or other client application) to enable the client computer 713 to establish communication with the back-end system in order to perform transactions. Thus, different types and configurations of client computers 713 may allow users to perform various different transactions within the system 700, such as initiating communication sessions or client computing sessions, performing secure data transfers, initiating eCommerce purchases or other financial transactions, etc. In some cases, client computers 713 may be used to perform transactions for which mobile devices 711 and/or other computer systems are not able or suitable to perform.

For example, the network of location-based client computers 713 in the transaction system 700 may be established to perform transactions that require a more secure communication network than standard mobile or cellular networks 715 and 717, transactions requiring the assistance or approval of a human agent, transactions requiring in-person verification of user identity, transactions requiring immediate payment and/or exchanges of physical goods, or the like. In some embodiments, the client computer 713 may be installed permanently at the location 710, while in other embodiments the client computer 713 may be capable of being moved to a different location and continuing to operate normally. For example, a web-based terminal 713 with client-side transaction system software may potentially be moved from a first retail store 710*a* to a different retail store 710*b*, and may continue to operate normally at the new location.

Location 710 may also include one or more digital kiosk systems 712. In some examples, a digital kiosk 712 may be integrated into the client computer 713, as a single interactive networked kiosk device 712-713. In other examples, the digital kiosk 712 may be a separate device, which may or may not be user-interactive, and may or may not be capable of communicating with the client computer 713. The digital kiosk system 712 may be installed and operated at the location 710, and in some cases, may operate at a location associated with the client computer 713. For instance, a digital kiosk system 712 in a particular retail store may be positioned near a client computer 713, where the kiosk system 712 may be configured to display transaction system information along with advertising and marketing content. In such cases, the kiosk system 712 also may be configured to provide interactive transaction staging and transaction support functionality for users, for transactions that will be completed via the nearby client computer 713. In other examples, the kiosk system 712 may be installed elsewhere within the same location 710, or at another nearby location from the client computer 713. For instance, the kiosk system 712 and client computer 713 may be installed in different areas within the same retail store 710 (or other location 710), or the kiosk system 712 may be installed outside a shopping center or in a building lobby to direct users to the particular store or location of the client computer 713.

In this example, location 710 also includes mobile computing devices 711*a*-711*d*. These mobile devices 711 may be personal devices (e.g., smartphones, wearable computing devices, etc.) associated with particular users, and generally will not be permanently located at the location 700. Rather, certain mobile devices 711 may enter the location 710 for a period of time, such as when the mobile device owner/user enters and shops for a time within a retail store location 710, stays for a time within a building lobby location 710, an airport or train terminal location 710, etc. In some embodiments, a mobile device 711 may be considered to be within the location 710 by comparing its current geographic coordinates to the coordinates corresponding to a particular location 710 (which may be received from the back-end system 720 via a mobile application). In other embodiments, a mobile device 711 may be considered to be within the location 710 whenever it is within communication range of the client computer 713 and/or kiosk 712 via a short-range communication network such as location-based WiFi network or Bluetooth network, etc. For example, when a digital kiosk 712 includes a mobile beacon 220, or when the client terminal 713 provides a short-range wireless network, then mobile devices 711*a*-711*d* may be considered to be within the location 710 whenever they are in range of such network(s) and capable of communication with the kiosk 712 and/or client terminal 713.

As shown in this example, devices 711-713 may communicate with the back-end system 720 via one or more different communication networks 715-717. For example, mobile devices 711 (e.g., smartphones) may use mobile communication networks 717, and may execute mobile applications configured to receive data from and transmit data to a mobile application server 721 of the back-end system 710. Based on this network infrastructure, the mobile devices 711 may communicate with the back-end system 710 whether or not the mobile devices 711 are currently at the location 710, and thus may maintain communication with the mobile application server 721 before arriving at the location 710 and after leaving the location 710. In contrast, the client computer 713 may be configured to communicate with a web application server 722 via computer networks 716. Computer networks 716 may be IP networks with wired network infrastructures, and thus unlike the mobile devices 711, a client computer 713 may be tethered to a particular location 710 in order to communicate with the back-end system 720. However, in some cases, a client computer 713 may be moved to another location 710 and may reconnect via the same or different computer networks 716, and in fact the web application server 722 might not even be aware that the client computer 713 has been moved. Finally, the digital kiosk system 712 may be configured to communicate via cellular network(s) 715. In some examples and in some locations 710, the cellular network(s) 715 may be the same as the mobile communication network(s) 717. In other example and/or locations 710, a digital kiosk system 712 may alternatively use the same computer networks 716 used by the client computer 713. Thus, in some cases, a kiosk installed at a particular location 710 may be removed from the location (and/or move to another location near another client terminal) while maintaining communication with the back-end system, while in other cases kiosks 712 also may be tied to particular networks and particular locations 710.

Additionally, as shown in this example, the different devices 711-713 at the location 710 may interact with different components/servers of the back-end system 720. Further, the different devices 711-713 may be configured to receive and transmit different types of data to and from the back-end system, using different interfaces, different protocols, and different secure transmission techniques. For example, mobile devices 711 may have positioning systems 210 (e.g., GPS receivers) and thus may be configured to detect and transmit their current location data (e.g., geographic coordinates) to the back-end system 720 in response to certain events detected or tasks performed via the mobile devices 711. In contrast, in some embodiments, neither the digital kiosks nor the client terminals 713 may have the capabilities to detect or transmit precise location data to the back-end system 720. As another example, client computer 713 may be configured to allow users to initiate and complete secure transactions (e.g., computing sessions, data transfers, financial transactions, etc.), and thus may use secure network protocols, encryption, and other data security techniques for transmitting/receiving user data and transaction data which cannot be provided by either of the digital kiosk systems 712 or the mobile devices 711. As yet another example, certain digital kiosks 712 may include mobile beacons 220 and thus may be capable of transmitting data to the back-end system 720 indicated which mobile devices 711 were detected near the kiosk system 712 at which times. In contrast, in some embodiments, neither the mobile devices 711 nor the client terminals 713 may have the capabilities to transmit data indicating which other devices were detect nearby at which times. Moreover, as discussed below in more detail, the different devices 711-713 at the location 710 also may have different display/output capabilities, and may be configured to support different interfaces and different user functionalities.

Back-end transaction system 720 may be implemented on a single computer server or a multiple different servers in collaboration, operating at one or more data centers/physical locations. As noted above, different client-facing components (e.g., hardware or software servers, services, etc.) may be implemented to interface with the different devices 711-713. As shown in this example, a mobile application server 721 may be used to communicate with multiple mobile devices 711 via one or more mobile communication networks 717, for instance, to receive current device position data from mobile devices 711, to communicate transaction staging information, user feedback data, and any determined information relating to specific locations 710 and/or to the transaction system as a whole. An application web server 722 may be implemented to interface with the client computers 713 operating at different locations 710 to receive and transmit transaction data. Additionally, an Internet of Things (IoT) device cloud application 723 may be implemented to handle communication with the network of digital kiosk systems 712 at different locations 710, for example, to transmit the content to be output via the different kiosks 712, and/or to receive device status data, transaction staging data, mobile beacon data, and other data detected or received by different kiosk systems 712.

Additionally, the back-end transaction system 720 in this example includes a number of back-end servers and/or processing engines (e.g., 724-726) configured perform the processes and other underlying functionality described below in more detail. As discussed below, the functionality of these back-end systems/services may rely on data received from certain remote devices 711-713, as well as based on data retrieved from the data stores 731-733 and/or other external systems 734 associated with the back-end system 720. For example, one or more transaction servers 725 may be configured to support the various transaction types supported by the network of client computers 713 at different locations 710. As noted above, in different embodiments these different transaction types may include various communication or computing sessions, secure data transfers, eCommerce or financial transactions, etc.

The kiosk monitor/control engine 726 may include the logical systems for monitoring data received from the various networks of remote devices 711-713, and for determining and/or generating content to be output to particular kiosk systems 712. In different embodiments, the IoT device cloud application 723 may be implemented on a computer server in the back-end system 720, either separately from and/or integrated into the kiosk monitor/control engine 726. In such examples, while the kiosk monitor/control engine 726 analyzes the received data and determines kiosk content, the IoT device cloud application 723 may provide connectivity management to individual kiosk systems 712, security and encryption, and/or real-time status support for kiosk monitoring. Additionally, the IoT device cloud application 723 may provide scalability by handling the addition or removal of kiosk systems 712 from the overall network. In some cases, the IoT device cloud application 723 also may perform the remote configuration and rebooting of kiosk devices 712 when such actions are determined by the kiosk monitor/control engine 726.

Additionally, in this example, the back-end system 720 may include a user feedback engine 724. The user feedback engine 724, described in more detail below, may be configured to determine and/or generate custom feedback user interfaces based on user data and/or location data received from various remote devices 711-713. The custom feedback user interfaces may be transmitted to particular mobile devices 711, and user feedback relating to an individual location 710 and/or the system 700 as a whole may be received from users via the custom feedback user interfaces. Various other types of processing engines, subsystems, and services relating to determining characteristics of transaction systems 700 and individual locations 710 also may be implemented within the back-end system 720 in other examples.

In order to perform these features and other functionality described herein, each of the components and sub-components discussed in the example transaction system 700 may correspond to a single computer server or a complex computing system including a combination of computing devices, storage devices, network components, etc. Each of these components and their respective subcomponents may be implemented in hardware, software, or a combination thereof. In some cases, mobile devices 711, digital kiosk systems 712, and/or client computers 713 may communicate directly with the back-end system 720, while other such devices may communicate with the back-end system 720 indirectly via one or more intermediary network components (e.g., routers, gateways, firewalls, etc.) or other intermediary devices (e.g., data management servers 102, content servers 112, etc.). Although the physical network components have not been shown in FIG. 7 so as not to obscure the other elements depicted, it should be understood that any of the network hardware components and network architecture designs may be implemented in various embodiments to support communication between the servers and devices in the system 700. Additionally, different devices 711-713 may use different networks and networks types to communicate with each other and/or with the back-end system 720, including one or more telecommunications networks, cable networks, satellite networks, cellular networks and other wireless networks, and computer-based IP networks, and the like. Further, certain components within transaction system 700 may include special purpose hardware devices and/or special purpose software, such as those included in I/O subsystems systems, positioning systems, and storage and networking capabilities of the various remote devices 711-713, as well as those within the processing engines, sub-components, and data stores of the back-end system 720.

In some embodiments, transaction systems 700 may be integrated within, or configured to operate in collaboration with, one or more electronic data transfer networks 100. For example, system 700 may be the same as, or may operate within or in collaboration with, any of the electronic data transfer network 100 described above. Thus, specific examples of transaction systems 700 may include, without limitation, secure systems for transferring value and other media of exchange, multi-entity systems for exchanging content resources (e.g., media files, educational and professional training content, gaming content, Internet content, etc.), and other electronic data transfer systems. In such cases, the back-end system 720 and its associated components, subsystems, and data stores may correspond to and may be implemented within a data management server 102 and/or a data store server 104, and remote devices 711-713 may correspond to the client devices described above in reference to network 100.

As noted above, the mobile devices 711 in this example may include any of the types of client devices 106 discussed above. For example, any of mobile devices 711 may be a laptop computer, smartphone, tablet computer, or various other type of mobile device, each of which may include some or all of the hardware, software, and networking components discussed above. Digital kiosk systems 712 may correspond to digital kiosk systems 206 including one or more of the additional components/features discussed above. Further, any of the remote devices 711-713 may be any computing device with sufficient memory, processing, and I/O subcomponents for receiving and/or presenting transaction data and/or other data related to the transaction system or locations from the client side. For instance, remote devices 711-713 may include all necessary hardware and software components to establish the network interfaces, security and authentication capabilities, and data caching capabilities to initiate and receive data transfer requests, and receive and provide data to users in real-time or near real-time. Moreover, certain of the remote devices 711-713 may include digital positioning systems (e.g., GPS receivers) or other location determination systems to detect and transmit device location data that may be used as described below to correlate devices with transactions, locations, and other devices, etc. Additionally, in some cases, remote devices 711-713 may change between locations 710, including changes in physical/geographic locations, as well as changes to their computing infrastructures (e.g., changes in network access or availability, changes in data centers or supporting hardware layers, etc.).

Figure 8:
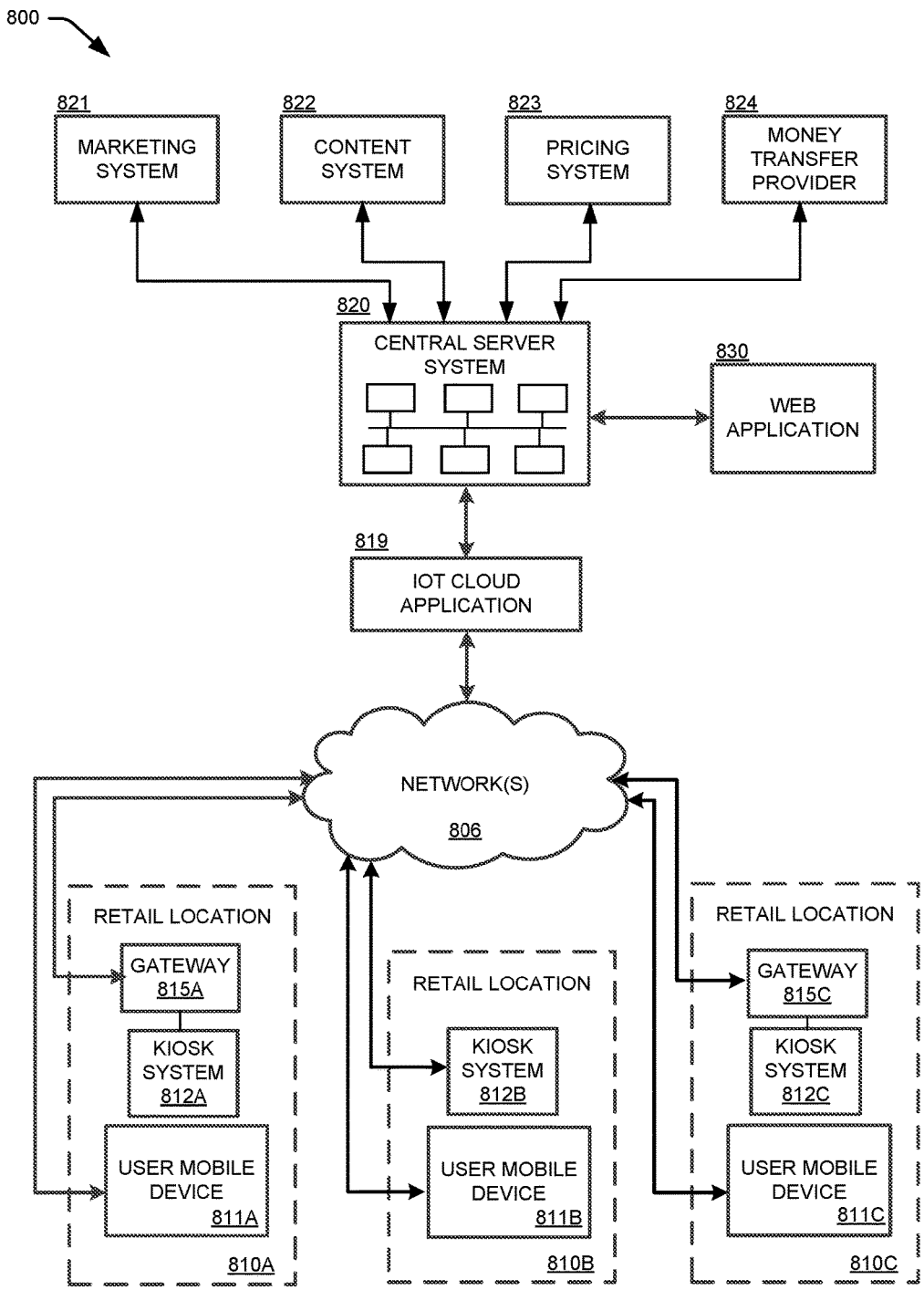
FIG. 8 is a block diagram illustrating another example of a transaction system including a central server system and a plurality of devices at multiple locations, according to one or more embodiments of the disclosure.

Although the transaction system of FIG. 7 is shown with a single location 710, it should be understood that such systems may include networks of many different locations. Further, transaction system 700 may be implemented using various different designs and arrangements of servers, sub-components, and processing engines. For instance, referring now to FIG. 8, another example transaction system 800 is shown. In this example, a plurality of kiosk systems 812 and/or user mobile devices 811 are shown operating at various retail locations 810. Devices 811 and 812 may communicate via network(s) 806 with a central server 820, which may include, among other components, a kiosk monitor and control engine (e.g., 726). The central server 820 also may be in communication one or more back-end service- and/or content-providers, including a marketing system 821, a content system 822, a pricing system 823, and/or a money transfer provider 824, etc. In some embodiments, each retail location 810 may include an integrated client terminal (not shown) configured to communicate with the central server 820 to support user-initiated transactions. In other embodiments, such transactions may be performed directly with user mobile devices 811 and/or kiosk systems 812, and thus client terminals might not be necessary in some retail locations 810. For instance, mobile application executing on a mobile device 811 may be configured to provide and support functionality to allow users to complete back-end transactions only when the devices is in the proximity of a kiosk system 812 at a retail location 810. In such cases, when a mobile device 811 is not located near a kiosk system 812 (e.g., as determined using GPS coordinates, a mobile beacon within the kiosk system 812, or by requiring connectivity through the kiosk system 812) the functionality to perform certain transactions on the mobile device 811 may be disabled.

The back-end services and/or content providers 821-824 may provide the content and/or functionality to be provided to retail locations 810. For example, marketing systems 821 and/or other content systems 822 may provide advertising content and conditions for defining which content is provided to which retail locations 810 at which times. Pricing systems 823 may provide dynamic real-time (or near real-time) pricing data that can be integrated with the content data provided by systems 821 and 822. In some embodiments, the pricing data and content/image data may correspond to separate content layers from separate providers, so that these data layers may be pushed out separately. Money transfer provider 824 may be capable of performing a variety of consumer-based value transfer transactions from senders to recipients. Merely by way of example, the money transfer provider 824 may facilitate wire transfers and bill payment transactions, among other products and services that may be provided.

As discussed above, network 806 may represent multiple different communication networks used respectively by mobile devices 811, kiosk systems 812, and/or transaction client terminals operating with various retail locations 810. For instance, network 806 may include one or more wireless communications networks, financial transaction networks, wide area computer networks (e.g., the Internet), cellular networks, and the like. In some examples, the network 806 may comprise a cellular network to deliver data and/or phone communication via 3G cellular network lines between the kiosk systems 812 and the central server system 820, or between the mobile devices 811 and the central server system 820. Additionally, although a single central server system 820 is shown, it should be understood that a plurality of central server systems 820 may be used in other examples.

The multiple retail locations 810 may be geographically dispersed and/or located remotely from one another, as well as from the central server 820 and the various back-end systems 821-824. Central server 820 may be configured to monitor, control, and customize the individual kiosk systems 812 at the retail locations 810, and such locations 810 may form a network through which products and services of back-end providers are made available to users via kiosk systems 812 and/or mobile devices 811. Although only three retail locations 810a-810c are shown for simplicity, numerous retail locations may be operatively connected to the central server system 820 via one or more different types of networks 806. For instance, a central server 820 may operate a network of hundreds of thousands of kiosk systems 812 at hundreds of thousands of different retail locations 810. User mobile devices 811, such as a smartphones, tablet computers, and the like, may be used at retail locations 810, for example, to communicate with kiosk systems 812 and/or to communicate directly with the central server system 820 in response to some data displayed on the kiosk systems 812. Although a single mobile device 811 is shown for each retail location 810, it should be understood that any number of user mobile devices 811 may be located on the premises of each retail location 810. For example, customers, employees, supervisors, passersby, and other users may each have one or more mobile device 811 operating at a retail location 810. Each mobile device 811 may provide, among other hardware and software elements, one or more mobile applications that are configured to initiate communication sessions with kiosk systems 812 and/or the central server 820.

In some embodiments, one or more web applications 830 may be provided, such as by the central server 820, to permit administrative users to control and configure the content received by back-end systems 821-824, the content provided to kiosk systems 812 and/or mobile computing devices 811, and the monitoring of all such systems that may be performed in various situations by the central server 820 (e.g., the status reporting and device detection features performed by kiosk systems 812 and/or mobile devices 811). In such embodiments, web applications 830 may comprise a webpage that is accessible via a laptop or a computer. In other examples, mobile applications executing on mobile devices 811 may provide similar functionality for monitoring and controlling of kiosk systems 812. Data security measures, such as encryption, decryption, encoding, and decoding schemes, may be implemented to facilitate the safe transmission, reception, and retention of the information from kiosk systems 812.

IoT cloud application 819 may correspond to the IoT device application 726 discussed above. In these examples, IoT cloud application 819 may be configured to perform content assembly from content providers 821-824, assign content to specific kiosk systems 812, implement content display schedules and monitoring schedules for kiosk systems 812, monitor the operational status of kiosk systems 812, trigger alerts in response conditions detected at kiosk systems 812, and perform device control functions as needed on kiosk systems 812. In various embodiments, a kiosk monitoring and control application may be implemented within the IoT cloud application 819 and/or within the central server 820, and may handle internal workflow (content), maintain rules and approval, assign and manage content distribution based on territories of kiosk systems 812, provide centralized reporting, perform alerting and troubleshooting, perform issue management tasks, and perform scheduling and staging to individual kiosk systems 812.

As shown in this example, in some embodiments an IoT cloud application 819 may be provided between the central server 820 and retail locations 810. The IoT cloud application 819 may be implemented on the central server 810 in some cases, either separately from and/or integrated into a kiosk monitor/control engine. In other cases, the IoT cloud application 819 may be implemented on separate servers and/or in separate datacenters. In various embodiments, the IoT cloud application 819 may provide connectivity management to individual kiosk systems 812, security and encryption, and/or real-time status support for kiosk monitoring. Additionally, IoT cloud application 819 may provide scalability by handling the addition or removal of kiosk systems 812 from the network 800. In some cases, the IoT cloud application 819 also may perform the remote configuration and rebooting of devices when such actions are determined by the kiosk monitoring and control engine.

In some cases, kiosk systems 812 may use separate gateway devices 815 to communicate with other devices via communication network(s) 806. As shown in this example, kiosk systems 812a and 812c each use an associated gateway device (i.e., 815a and 815c) to receive and store content, store and transmit operational status, and the like. In some cases, such a gateway device 815 may be integrated into the physical kiosk system 812. In such embodiments, various gateway devices 815 may be secure SIM gateway integrated with their respective kiosk systems 812. For example, cellular programmable gateways 815 may be used in some cases, while other gateway devices 815 supporting similar functionality may be used in other cases. Gateway devices 815 may be configured to securely store the content received from the central server 820, and deliver the content to the display of kiosk systems 812 as directed by central server 810. In some cases, gateway devices 815 also may monitor the operational status of kiosk systems 812, and may trigger (e.g., transmit to the central server 810 or other external system) alarm conditions based on the operational statuses of kiosk systems 812. As noted above, kiosk systems 812 may include touchscreen or static display screens, as well as support for video, sound, and/or static imagery. In some cases, mobile devices 811 may be used in conjunction with kiosk systems 812 to display output and/or receive input from users at retail locations 810. Additionally, kiosk systems 812 and/or gateways 815 may support vendor managed maintenance (e.g., remote or local maintenance) and/or data plan management for upstream and downstream communications. In some cases, gateway devices 815 (e.g., cellular programmable gateways) may be configured to automatically connect to one or more device clouds. The gateways 815 may monitor the health of the kiosk system 812, and may trigger alarms to be sent to one or more applications (e.g., web applications 830, applications on user mobile devices 811) and/or provide notifications via emails, SMS, MMS, and the like, in response to the detection of various device operation statuses. In some cases, gateway devices 815 may be setup for communication via one or more specified cellular telecommunications networks 806. In such cases, gateway devices 815 also may be configured to manage carrier costs and handle security.

As noted above, a device cloud may be used in some embodiments. The capabilities provided by the device cloud (e.g., via the IoT cloud application 819) may include, for example, automation of the registration of newly connected kiosk systems 812, and user interface support including viewing of all remote kiosk systems 812 including graphical mapping of the locations of all kiosk systems 812. In some cases, the device cloud may support device grouping and scheduling of operations, so that users can instruct the central server 820 to setup and manage kiosk systems 812 at retail locations 810 by market areas. Additionally, the device cloud may be used (e.g., via the IoT cloud application 819) to remotely update the digital content to be displayed via the kiosk systems 812, as well as the device firmware of the kiosk systems. Additionally, device cloud may be used to remotely provision the cellular services of the kiosk systems 812, reboot devices, configure devices, and reset device defaults. In some cases, device cloud functionality also may be used to perform statistical analyses and reporting based on data received from the plurality of kiosk systems 812 (and/or gateways 815), as well as alarm generation based on various conditions detected at kiosk systems 812 (e.g., too many disconnects, weak signal, heavy traffic devices, etc.). Such alarm conditions may be customized to implement user-defined events.

Figure 9:
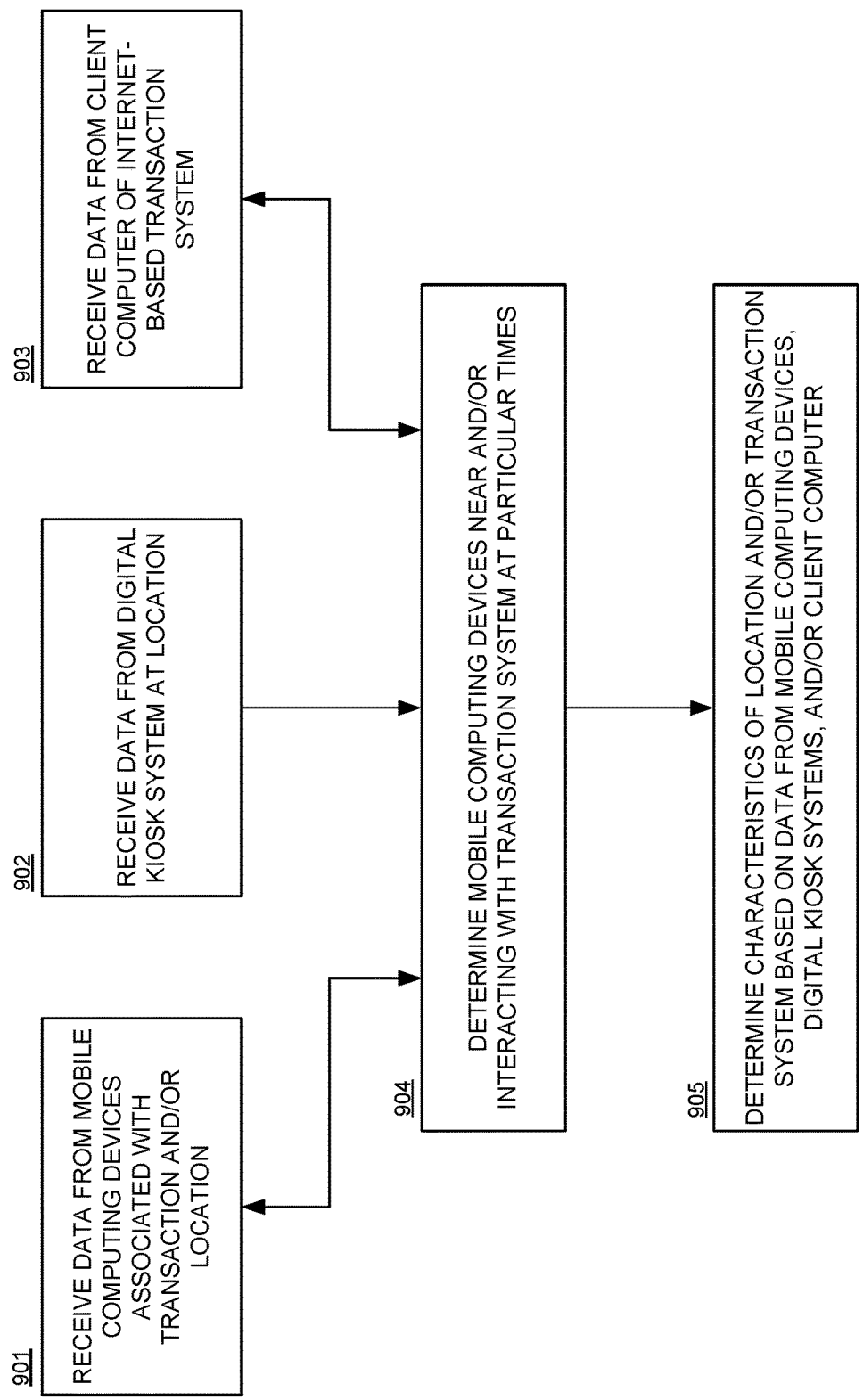
FIG. 9 is a flow diagram illustrating an example process of determining characteristics of a transaction system and/or location based on data received from multiple client devices via multiple networks, according to one or more embodiments of the disclosure.

Referring now to FIG. 9, a flow diagram is shown illustrating an example process of determining characteristics of a transaction system and/or location within a transaction system, based on data received from one or more client devices via one or more communication networks. As described below, the steps in this process may be performed by one or more components in the transaction systems described above (e.g., system 700), such as the back-end system 720 operating in communication with the remote devices 711-713 at one or more locations 710. However, it should be understood that the various features and processes described herein, including receiving data from and transmitting data to various networks of mobile devices 711, kiosk systems 712, and client terminals 713, as well as correlating device interactions with locations/events, and determining characteristics of transaction systems 700 and particular locations 710, need not be limited to the specific systems and hardware implementations described above in FIGS. 1-8.

In steps 901-903, the back-end system 720 may receive data from various networks of remote devices 711-713 associated with a single location 710 (e.g., a retail location) or multiple different locations 710. In some embodiments, steps 901-903 may include several separate data transmissions received over separate networks 715-717, occurring in response to user-initiated actions occurring at remote device 711-713. In other cases, remote devices 711-713 may be configured to transmit data automatically (e.g., not in response to a user-initiated actions) based on the detection of certain conditions, interactions with other devices 711-713, and/or in response to a data request from the back-end system 720. Thus, steps 901-903 may occur in any order, and each of these steps may occur multiple times corresponding to multiple data transmissions from their respective networks of remote devices.

Step 901 corresponds to data received by a back-end system 720 from one or more mobile devices 711 associated with one or more remote locations 710 in the transaction system 700. As discussed above, certain mobile devices 711 may have installed mobile applications associated with the transaction system 700. Such mobile devices 711 may provide various user functionalities, and may handle the communications with the back-end system 720. For example, certain mobile applications may allow users to search for the specific physical locations 710 having a client computer 713 and/or kiosk system 712 that will enable users to perform transactions. Additionally, mobile applications may provide functionality for users to review their transaction histories and/or to provide feedback relating to specific transactions, the transaction system 700 as a whole, or relating to specific client locations 710 within the network of the transaction system 700. In some embodiments, mobile applications also may allow users to stage new transactions via their mobile devices 711. However, as noted above, certain transactions may be staged (e.g., opened or initiated) via mobile devices 711 anywhere, but must be completed using client computers 713 and/or kiosk systems 712. Thus, in such cases, transactions may be initiated via mobile devices 711 anywhere, but users (and/or their mobile devices 711) may be required to physically visit a client location 710 of the transaction system 700 in order to complete the transaction.

The data received from mobile devices 711 in step 901 also may include device location and/or data identifying other devices detected in the proximity of the mobile device 711. For example, a mobile application of the transaction system 700, which is installed and executing on a mobile device 711, may record the physical location of the mobile device 711 before, during, and after any of several different user interactions with the mobile application. For instance, the location of the mobile device 711 may be detected and stored (e.g., using a GPS receiver or other positioning system) in response to a user request to search for nearby client locations 710 of the transaction system 700, when a user provides feedback via the mobile application, and/or when a user stages or initiates a transaction via the mobile application. Additionally, in some embodiments, a mobile application installed on the mobile device 711 may detect when the mobile device 711 is near a kiosk system 712 or a client computer 713, and/or when another mobile device 711 running the same application is nearby, and may be configured to determine its current location data in response to detecting other nearby remote devices 711-713, along with data identifying the nearby devices. This location data and other device identifier data may be transmitted to the back-end system 720 via mobile networks 717.

Step 902 corresponds to data received by the back-end system 720 from one or more digital kiosk systems 712 associated with one or more remote locations 710 in the transaction system 700. In some embodiments, digital kiosk systems 712 may support various user interactions, including some or all of the user interactions discussed above that may be support by mobile applications via mobile devices 711. Thus, digital kiosk systems 712 may collect and transmit data indicating that a specific user used the kiosk system 712 to stage a new transaction, provide feedback, review the user's transaction history, ask a question about a transaction system, etc. Such data may include an identifier of the user that interacted with the kiosk 712, the time of the interactions, and the nature of the interactions. In some cases, kiosks 712 also may collect and transmit various self-monitoring and/or diagnostic data (e.g., status, errors, alerts, notifications, etc.) to the back-send system 720. Additionally, certain kiosk systems 712 may detect nearby mobile devices 711 and may collect and transmit to the back-end system 720 data identifying the mobile devices 711 and/or associated users, specific locations and movements of the mobile devices 711 with respect to the kiosk 712, and the times associated with the first detection and last detection of the device, device movements within the location, etc.

Step 903 corresponds to data received by the back-end system 720 from one or client computers 713. As discussed above, client computers 713 may be used to perform secure transactions and to provide other transactions/services to users, including but not limited to communication sessions (e.g., email, voice, video conferencing, etc.), computing sessions (e.g., gaming, social networking, online training sessions, etc.), eCommerce or financial transactions (e.g., online purchases, money transfers, eBanking transactions, etc.), and the like. In many cases, client computers 713 may be used to perform transactions for which mobile devices 711 are not able or suitable to perform, such as transactions requiring a more secure communication network than standard mobile or cellular networks 715 and 717, transactions requiring the assistance or approval of a human agent, transactions requiring in-person verification of user identity, transactions requiring immediate payment and/or exchanges of physical goods, etc. Thus, the data received in step 903 may correspond to the transaction data received from the client computers 713, for example, user identifiers, account identifiers, transaction identifiers, transaction types, and any other transaction details.

In step 904, the back-end system 720 may use the data received from the remote devices 711-713 in step 901-903, to determine that certain mobile computing devices 711 were present at certain locations 710 and/or interacted with the other devices 711-713 in the transaction system 700. Thus, step 904 may involve analyzing the data received from different devices 711-713 and over different networks 715-717, and determining correlations in the data based on device identifiers, user identifiers, time, location, transaction details, and other factors.

As discussed below in more detail in step 905, the correlations determined in this step may be valuable in determining certain characteristics of the transaction system 700 and/or particular locations 710. For example, in many embodiments, the entity (or entities) that provide, operate, and maintain the networks of digital kiosk systems 712 and client computers 713, and that provide the associated mobile applications to client devices 711, may be separate from and unaffiliated with the entities that own and maintain the physical locations 710 at which the kiosk systems 712 and client computers 713 are installed and operate. For instance, if a provider of a digital kiosk system 712 and client computer 713 at a particular retail store location 710 is unaffiliated with the retail store entity, the provider might not have access to any information regarding the retail store or when, where, and how the kiosk system 712 and client computer 713 are used within the retail store location 710. In such cases, if the retail store moves to a different location 710, changes store hours, moves the locations of the kiosk system 712 and client computer 713 within the store, changes the employees responsible for operating and maintaining the kiosk system 712 and client computer 713, and/or if the customer traffic patterns or customer characteristics of the store change, the retail store might not notify the provider of the digital kiosk system 712 and the client computer 713, and the provider may have no other way of identifying such changes. The correlations identified in step 904, and the corresponding characteristics determined in step 905, give the provider the means identify such changes and other characteristics of the transaction system and device networks 700.

As noted above, step 904 may involve performing various analyses of the data received in steps 901-903, in order to determine correlations in the data based on device identifiers, user identifiers, time, location, transaction details, etc. For example, the data detected by a mobile beacon 220 of a kiosk system 712 may include identifies of the mobile devices 711 that were near the kiosk system 712 at particular times. Additionally, the client-side transaction data received from client computers 713 may include, among other transaction details, user identifiers and transaction timestamps that may be used to determine that a particular user was at the location 710 of the client computer 713 at that time. Additionally, when a user stages a transaction using a kiosk system 712 or using a mobile application on the user's personal device 711, the staging data may identify the user's location at the time the user staged the transaction. Similarly, when a user searches for transaction client locations 710 within the network via a mobile application on their device 711, or from a kiosk system 712 (e.g., searching for other nearby client locations 710), the device used for the search may identify the user's location at the time the user performed the search. Similarly, when a user provides feedback on a transaction, a location 710, or the transaction system 700 as a whole via a mobile application on their device 711 or from a kiosk system 712, the client device may identify the user's location at the time that the feedback was provided. In some cases, mobile devices 711 also may include mobile beacons 220 or similar technologies that allow the devices 711 to detect other nearby devices 711 with the same mobile application (e.g., the mobile application provided by the back-end transaction system 720). In these cases, mobile devices 711 may be able to identify their locations with respect to other mobile devices 711 in the system 700 at particular times.

In step 905, the back-end system 720 may use the determinations/correlations of step 904 between the various remote devices 711-713, along with other data received in steps 901-903, to determine characteristics of a particular location 710 and/or of the transaction system 700 as a whole. The following paragraphs describe several examples of different characteristics of locations 710 and/or transaction systems 700 that may be determined with these steps, although it should be understood that these examples are illustrative only and non-limiting.

In certain examples, the back-end system 720 may determine the physical location of a kiosk system 712 and/or client computer 713 based on the data and analyses described in the steps above. This may be useful, for example, if the retail store relocates to a different address 710 with their kiosk system 712 and/or client computer 713, or if the retail store moves these devices to different locations within the store 710. In such cases, the back-end system 720 and provider of the kiosk 712 and client computer 713 may be unaware of the precise locations of these devices. In order to determine the location of a kiosk system 712, the location data (e.g., GPS coordinates) received from the mobile device 711 may be matched to the times that the mobile beacon 220 of the kiosk system 712 detected that the same mobile device 711 was nearby. For kiosks 712 without mobile beacons, it may still be possible to match the location data from the mobile device 711 at the times that the user of the mobile device 711 performed certain tasks on the kiosk 712, such as staging a transaction, reviewing a transaction history, or performing any other interaction with the kiosk system 712. Similarly, in order to determine the location of a client computer 713, the location data received from the mobile device 711 may be matched to the timestamp that a user associated with the mobile device 711 initiated a transaction on the client computer 713.

In other examples, the back-end system 720 may determine the store hours of a retail store location 710, or operating hours of a different type of location 710, based on the data and analyses described in the steps above. This may be useful, for example, if the entity that provides of the kiosk system 712 and/or client computer 713 does not know the operating hours of the location 710, or if those hours change. In order to determine the operating hours of a location 710, the back-end system 720 may use data from user interactions with the kiosk system 712, data from a mobile beacon 220 of the kiosk system 712, and/or transaction data from the client computer at the associated location 710. For instance, if over a number of days, the earliest received client transactions and earlier detected user interactions with the kiosk system 712 begin just after 10:00 am, and stop just before 8:00 pm, then the back-end system 720 may determine that the current hours of the retail location 710 are 10:00 am to 8:00 pm. Similar techniques may be used to determine when the operating hours of the location 710 are changed, that the location 710 has different operating hours on different days of the week, which holidays are observed by the location 710, and how frequently the location 710 opens late or closed early, etc. In other examples, if user interactions with the kiosk system 712 (e.g., beacon detections, direct user interactions, etc.) consistently begin earlier and end later, then the back-end system 720 may determine that the operators of the retail store 710 have placed the kiosk 712 in a different location than the client computer 713 (e.g., in a publicly available lobby or other area just outside the store 710), or that the personnel operating the client computer 713 keep different hours than those operating the location 710.

In still other examples, the back-end system 720 may determine average wait times for customers to complete transactions via the client computer 713 at the location 710. For instance, when the users at a location 710 are able to (or required to) use an on-site kiosk system 712 to check-in and/or stage their requested transaction. The back-end system 720 may compare the timestamps of the user's interaction with the kiosk system 712, to the timestamp of the user's transaction subsequently completed on the client computer 713, to determine the user's wait time for completing the transaction. In other cases, the data collected by a mobile beacon 220 of the kiosk system 712 and/or location data from the user's mobile device 711 may be used to determine when the user first arrived at the location 710, and this time may be compared to the timestamp of the user's subsequent transaction to determine the user's wait time. As yet another example, if a user opens the mobile application provided by the transaction system 700 in order to search for a nearby client location 710, and then subsequently completes a transaction from the client computer 713 at that location 710, then the back-end system 720 may determine the user's wait time at the location based on the time of the initial location search, the distance and anticipated travel time to the location, and the timestamp of the transaction.

It should be understood that the location characteristics determined in the above examples are illustrative only, and that many different types of characteristics relating to client locations 710 and/or to the transaction system 700 as a whole may be determined using steps 901-905. For instance, the data collected in steps 901-903 may be used to determine the transaction error rate at different locations 710 and at different times, in order to determine which personnel may need additional training, and what types of additional training they may need. Additionally, direct user interactions with kiosk systems 712, detections of mobile devices 711 by beacons in the kiosk systems 712, and/or interactions between two or more mobile devices 711, may be used by the back-end system 720 to determine customer traffic patterns at the location 710 at different times (e.g., total customers at different time, average length of shopping visit, number/frequency of return visits to location 710, etc.). Finally, as discussed in more detail below, direct user feedback received from kiosk systems 712 and/or from mobile applications on mobile devices 711 may be used in conjunction with the additional data received in steps 901-903 to determine customer experience and satisfaction data, as well as additional location/system characteristics.

Figure 10:
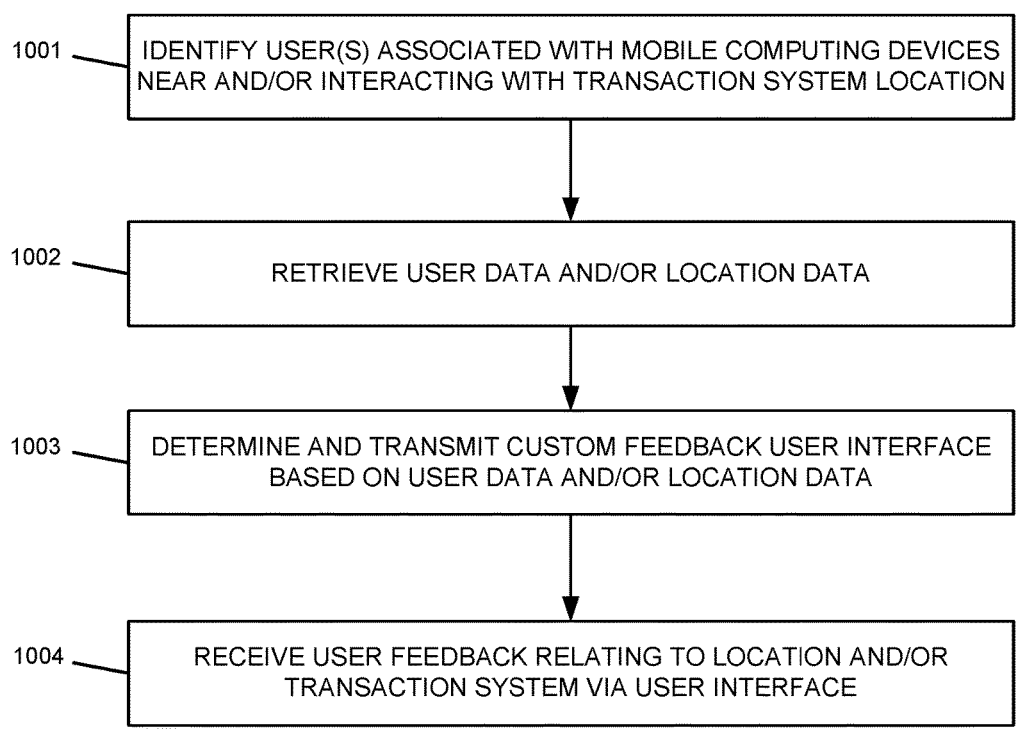
FIG. 10 is a flow diagram illustrating an example process of determining and transmitting a custom feedback user interface to a mobile computing device to receive feedback relating to a transaction system and/or location, according to one or more embodiments of the disclosure.

Referring now to FIG. 10, a flow diagram is shown illustrating an example process of determining and transmitting a custom feedback user interface to a mobile computing device to receive feedback relating to a particular client location 710 and/or a transaction system as a whole 700. As discussed below, steps 1001-1003 in this process may be a specific implementation of the steps in FIG. 9, while steps 1003-1004 describe the additional features of transmitting a custom feedback user interface and receiving user feedback via the custom interface. Thus, the steps in this process similarly may be performed by one or more components in the transaction systems described above (e.g., system 700), such as the back-end system 720 operating in communication with the remote devices 711-713 at one or more locations 710. However, the various features and processes described herein need not be limited to the specific systems and hardware implementations described above in FIGS. 1-8.

In step 1001, the back-end system 720 may identify that a particular user and/or a particular mobile device 711 was physically present at a location 710. In some cases, step 1001 may include determining that a user and/or a mobile device 711 interacted with a kiosk system 712 or client computer 713, while in other cases step 1001 may involve only determining that a user and/or a mobile device 711 was present at location 710 (but might not have interacted with a kiosk system 712 or client computer 713). Thus, step 1001 may be similar to step 904 discussed above. For instance, step 1001 may include detecting the presence of a nearby mobile device 711 by a mobile beacon 220 in a kiosk system 712, receiving a direct user interaction at a kiosk system 712, and/or receiving transaction data at a client computer 713 that identifies a particular user. When only a mobile device identifier (e.g., mobile number) is identified/detected in step 1001, the back-end system 720 may use a data store (e.g., user data store 732) to determine the user based on the mobile device identifier.

In step 1002, the back-end system 720 may retrieve additional data relating to the particular user and/or the particular location 710 identified in step 1001. For example, user data may be retrieved from the user data store 732 including the device identifiers/addresses associated with the user (e.g., email addresses, IP addresses, mobile numbers, etc.), the user's transaction history, and the user's role and/or authorization level within the transaction system 200. Location data may be retrieved (e.g., from kiosk data store 731) including data identifying the particular hardware and software systems/features operating at the kiosk system 712 and/or the client computer 713.

In step 1003, the back-end system 720 may use the particular user data and/or particular location data retrieved in step 1002 to determine and transmit a customer feedback user interface to the particular user. In general, a transaction system 200 may request and receive feedback from its users regarding particular transactions, particular devices (e.g., kiosk systems 712 and/or client computers 713), the particular locations 710 at which those devices are installed, and/or the personnel operating those devices and facilitating the transactions for the users. To receive feedback from users, a back-end system 720 may request feedback in several different ways, including by email, phone, via a mobile application on the user's mobile device 711, or from a kiosk system 712. In step 1003, the request for user feedback may be customized to the particular user and/or particular location determined in step 1001. For example, users completing certain transaction types may be asked for feedback regarding those transaction types, and users having a particular role (e.g., customer, employee, technician, etc.) may be asked for particular feedback based on their role. Additionally, the feedback requested from a user may depend on the user's level of experience with the transaction system 700 (e.g., a first-time user versus an experienced user). The user feedback requested also may be based on the particular devices with which the user interacted during the visit to the location (e.g., kiosk systems 712 and/or client computers 713), and based on the characteristics of the location 710 itself. Thus, in step 1003, the back-end system 720 may determine a customized feedback user interface based on some or all of the above factors, and may transmit the customized feedback user interface to the user at one or more of the user's devices/network addresses. For instance, immediately following a user's visit to a location 710, the user may receive customized feedback user interface via the mobile application on the user's mobile phone 711, where the user interface is customized based on the above user-specific and location-specific factors, and based on the interactions that the user had with the various devices at the location 710 during the user's recent visit.

In step 1004, the back-end system 720 may receive the user's responses via the customized feedback user interface transmitted in step 1003. For instance, the user may provide feedback to the customized user interface from within the mobile application of the transaction system 700 running on the user's mobile device 711. In other examples, the user may provide feedback to the customized user interface via a customized email form, a customize voice response unit, or via a customized user interface displayed to the user via the kiosk system 712 at the end of the user's visit to the location 710.

Figure 11:
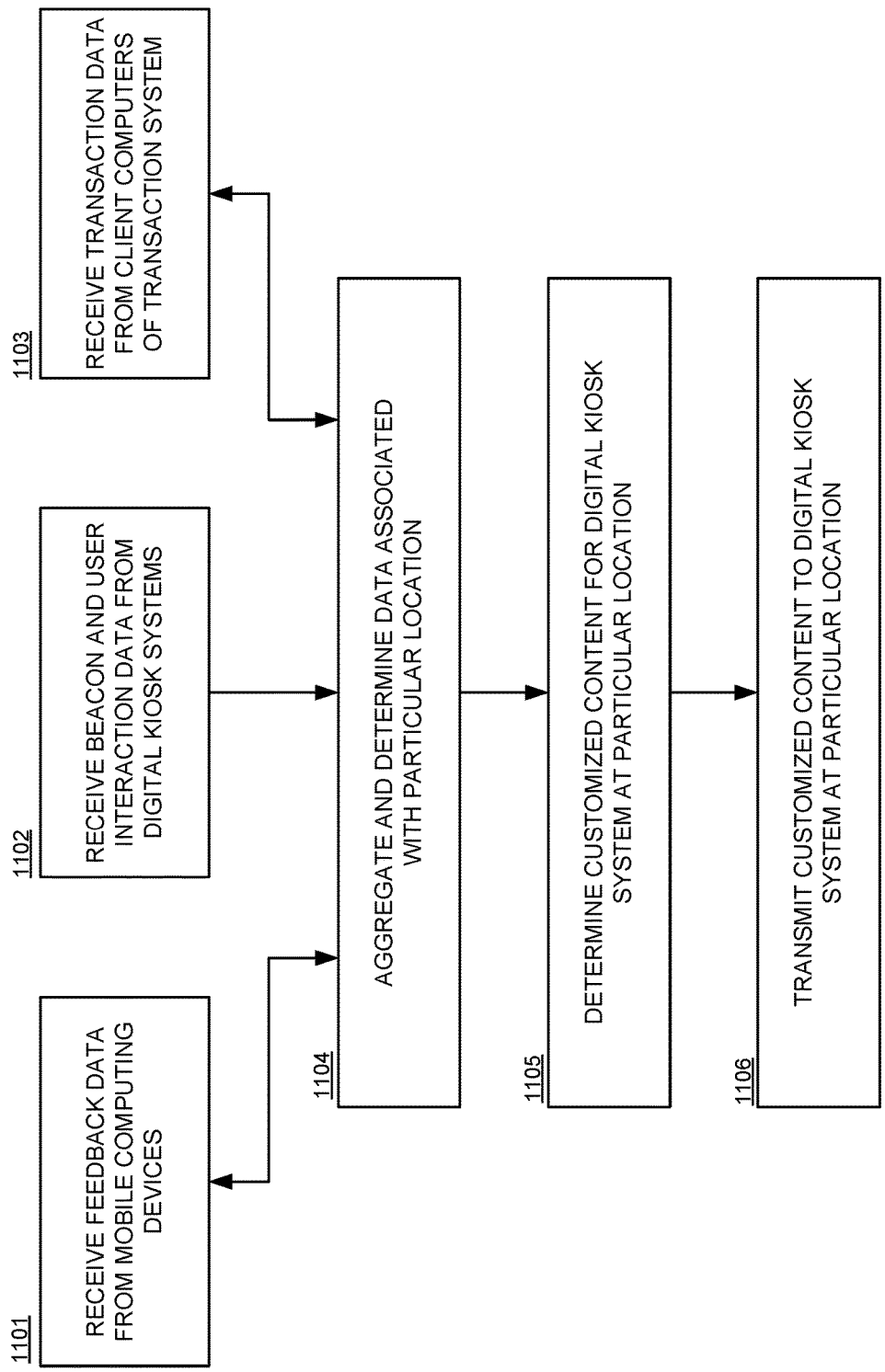
FIG. 11 is a flow diagram illustrating an example process of determining customized content for a digital kiosk system based on data received from client devices relating to a transaction system and/or location, according to one or more embodiments of the disclosure.

Referring now to FIG. 11, a flow diagram is shown illustrating an example process of determining customized content to a digital kiosk system 712 based on data received from client devices relating to a transaction system 700 and/or particular location 710. As discussed below, steps 1101-1103 in this process may be a specific implementation of the steps in FIG. 9, while steps 1005-1006 describe the additional features of determining and transmitting customized content to a particular kiosk system 712 for display. Thus, the steps in this process similarly may be performed by one or more components in the transaction systems described above (e.g., system 700), such as the back-end system 720 operating in communication with the remote devices 711-713 at one or more locations 710. However, the various features and processes described herein need not be limited to the specific systems and hardware implementations described above in FIGS. 1-8.

In steps 1101-1103, the back-end system 720 may receive data from one or more remote devices 711-713 operating at a particular client location 710 in the transaction system 700. Thus, steps 1101-1103 may be similar or identical to steps 901-903 described above in FIG. 9. Specifically, in step 1101, the back-end system 720 may receive user feedback data from one or more mobile devices 711 relating to various locations 710 in the transaction system 700. In step 1201, the back-end system 720 may receive data from one or more kiosk systems 712 at various locations 710, including mobile beacon data identifying specific mobile devices 711 that have been detected near the kiosk systems 712, and/or data relating to direct user interactions with the kiosk systems 712 (e.g., transactions staged by the particular user, data requests by the particular user, etc.). In step 1103, the back-end system 720 may receive transaction data from one or more client computers 713 at various locations 710.

In step 1104, the data received in steps 1101-1003 may be analyzed and correlated by user, device, time, and/or location, and other relevant factors, and may be aggregated into groups of data associated with a particular location 710. The data analysis and correlations preformed in step 1104 may be similar or identical to those performed in step 904. For instance, an aggregated data set determined in step 1104 may include the user feedback data, mobile beacon data, user-kiosk interaction data, and transaction data associated with a particular location 710 (and/or the devices 712-713 operating at the location 710).

In step 1105, the back-end system 720 may determine customized content for the digital kiosk system 712 at the particular location 710. In step 1106, the back-end system 720 may transmit the determined customized content to the kiosk system 712 with instructions to display the customized content at the location 710. In some cases, the back-end system 720 may receive and analyze the data from the various data sources quickly, in which case the determined customized content may be transmitted in real-time (or near real-time) to the kiosk system 712 for immediate display. In other cases, the back-end system 720 may determine a future time at which the customized content should be displayed, and may transmit the content with instructions for the kiosk system 712 to display the content at the determined future time.

The customized content determined and transmitted to the particular kiosk system 712 in steps 1105-1006 may include any of the several different examples described herein, and may relate to any of the characteristics determined in step 905, discussed above. For example, referring now to FIGS. 12A-12D, several examples of customized user interface content are shown on the display screens of digital kiosk systems 712. As discussed below, in each of these examples, the customized content display may be determined by the back-end system 720 based on data received from the various client devices 711-713 relating to the particular location 710 at which the kiosk system 712 is installed.

Figure 12A:
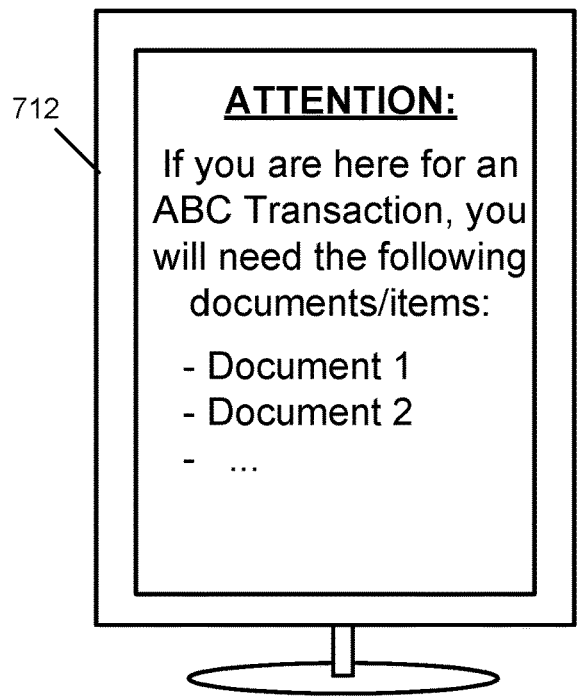
FIGS. 12A-12D are example user interface display screens of a digital kiosk system displaying content customized based on data received from client devices relating to a transaction system and/or location, according to one or more embodiments of the disclosure.

In FIG. 12A, an informational message is displayed to customers via the kiosk system 712. In this example, this particular informational message may have been selected based on the transaction data received from the client computer 713 (e.g., indicating a large number of transactions of type ABC), and/or user feedback from the mobile devices 711 and/or kiosk system 712 indicating that some users were unclear about the documents required to complete an ABC transaction.

Figure 12B:
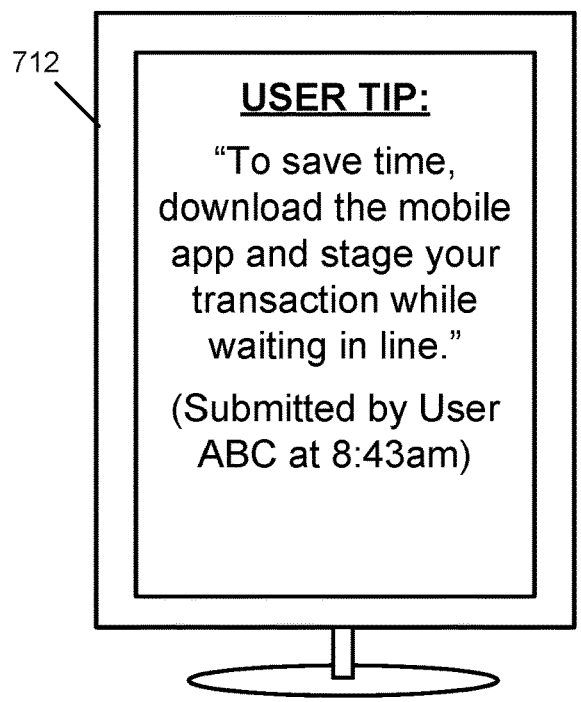

In FIG. 12B, a user tip is displayed to customers via the kiosk system 712. In this example, this user tip may be part of a rotating user tip display screen, where each user tip in the rotating display corresponds to a user comment received from a user feedback interface associated with the location 710. As discussed above, location-specific user feedback may be received, for example, from a kiosk system 712 at the location 710, or from a mobile application running on the mobile device 711 of a user who has recently visited the location 710.

Figure 12C:
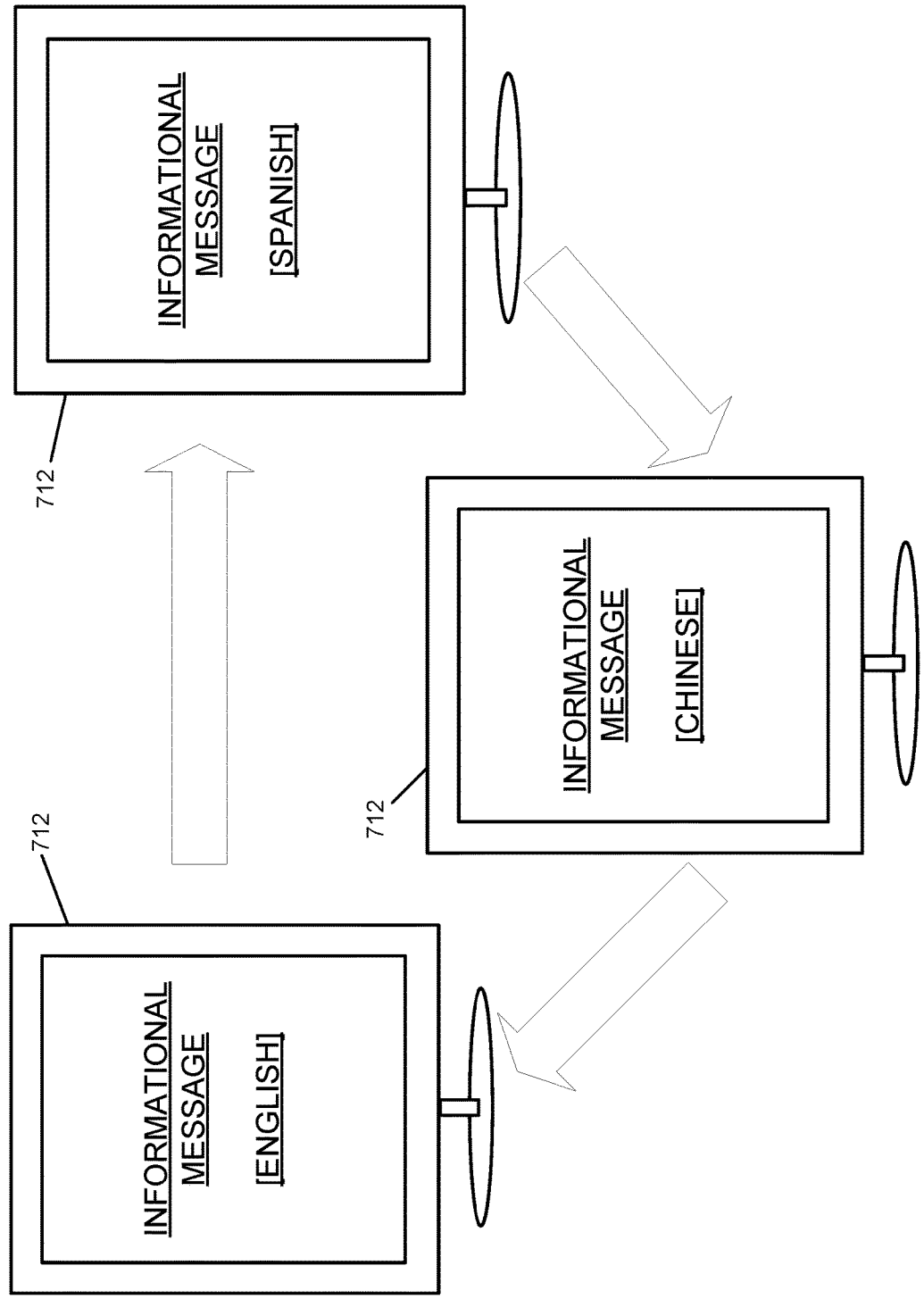

In FIG. 12C, an informational message rotating in three different languages is displayed to customers via the kiosk system 712. In this example, the particular informational message may be a standard message, or may be a customized message for the particular kiosk 712 as discussed above in FIG. 12A. Additionally, the different languages that are used to display the message may be based on the data received from the remote devices 711-713 in steps 1101-1103. For example, if user feedback is received (e.g., via the kiosk system 712, or via a mobile application on a user's device 711) in a certain language, then the back-end system may assume that language is the primary language of the user providing the feedback. Additionally, in some embodiments, mobile beacon data (e.g., customer mobile numbers) collected by the kiosk system 712 may be transmitted to and used by the back-end system 720 to retrieve the corresponding customer details, including the language preferences of the customer's that were near enough to the kiosk system 712 to be detected by the mobile beacon. Further, in some cases, language data may be determined based on transaction data received from the client computer 713 at the location. In this example, as in every other example in which customized content is provided to a particular kiosk system 712, the determination of the customized content may be based only on current data (e.g., for real-time customized content) or may be based on historic data. For instance, the selection of the three languages in the rotating information message in FIG. 12C may be based on data collected over a number of days/weeks/months to determine the language preferences of the customers that visit the location 710 at certain times. In other cases, the selection of the three languages in the rotating information message may be based only on the most current data received from devices 711-713, and the subsequent determination by the back-end system 720 that these are the languages spoken by the customers currently present at the location 710.

Figure 12D:
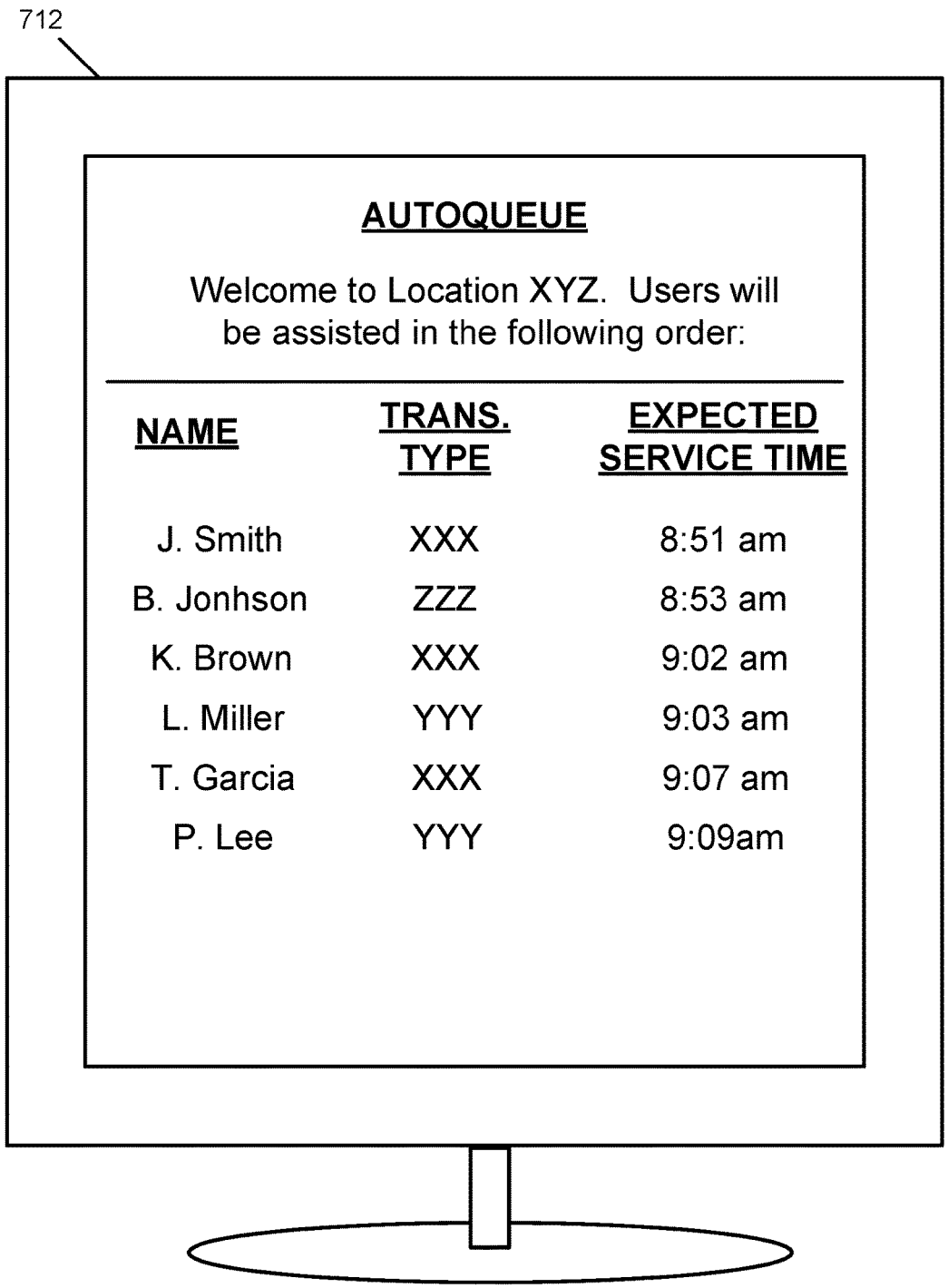

In FIG. 12D, the customized message displayed to customers via the kiosk system 712 is an autoqueue customer list determined by the back-end system 720 and/or by the kiosk system 712. In this example, as each customer arrives at the location 710 with the intention of performing a transaction, the back-end system 720 and/or by the kiosk system 712 detects the presence of the customer and adds the customer's name to the autoqueue list. In some embodiments, the customer's presence may be detected automatically without the need for the customer to interact with the kiosk system 712, the client computer 713, or any employees at the location 710. For example, if the kiosk system 712 includes a mobile beacon 220, the mobile beacon 220 may detect when a customer has arrived at the location 710, and may automatically add the customer's name to the autoqueue. In other examples, the location/positioning data collected by the user's mobile device 711 may be used to determine when the customer has arrived at a location 710. In still other examples, the user may be permitted to stage a transaction using the mobile application on their mobile device 711, before arriving at the location. In these examples, the user may be automatically added to the autoqueue as soon as they remotely stage their transaction, and/or as soon as soon as they begin traveling to the location 710. As this example shows, a real-time autoqueue displayed via a kiosk system 712 at a location 710 also may include various additional features, such as the transaction type that the user is queued up to perform, and/or the anticipated service time for the user. In this example, the user's transaction type may be determined based on information received by the user staging the transaction (e.g., either via the kiosk system 712 or the user's mobile device 711), or may be determined by the user's authorization credentials (e.g., retrieved from user data store 723) and/or the user's history of transactions/patterns.

Figure 13A:
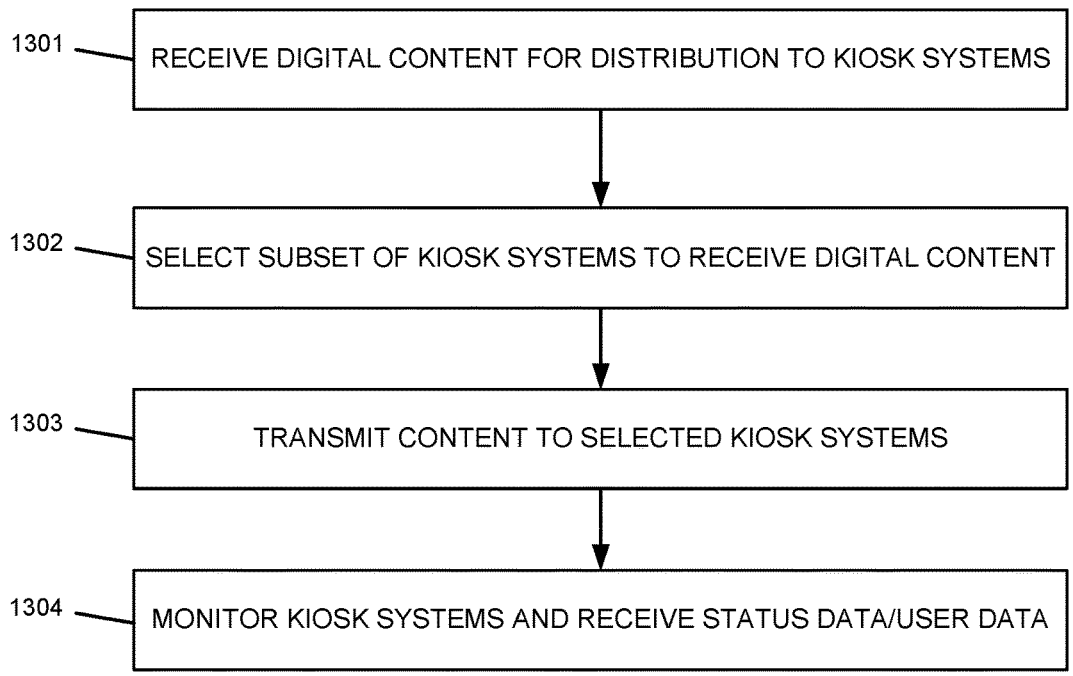
FIGS. 13A-13C are flow diagrams illustrating example processes of determining and providing content to digital kiosk systems, and subsequently monitoring the digital kiosk systems, according to one or more embodiments of the disclosure.
Figure 13B:
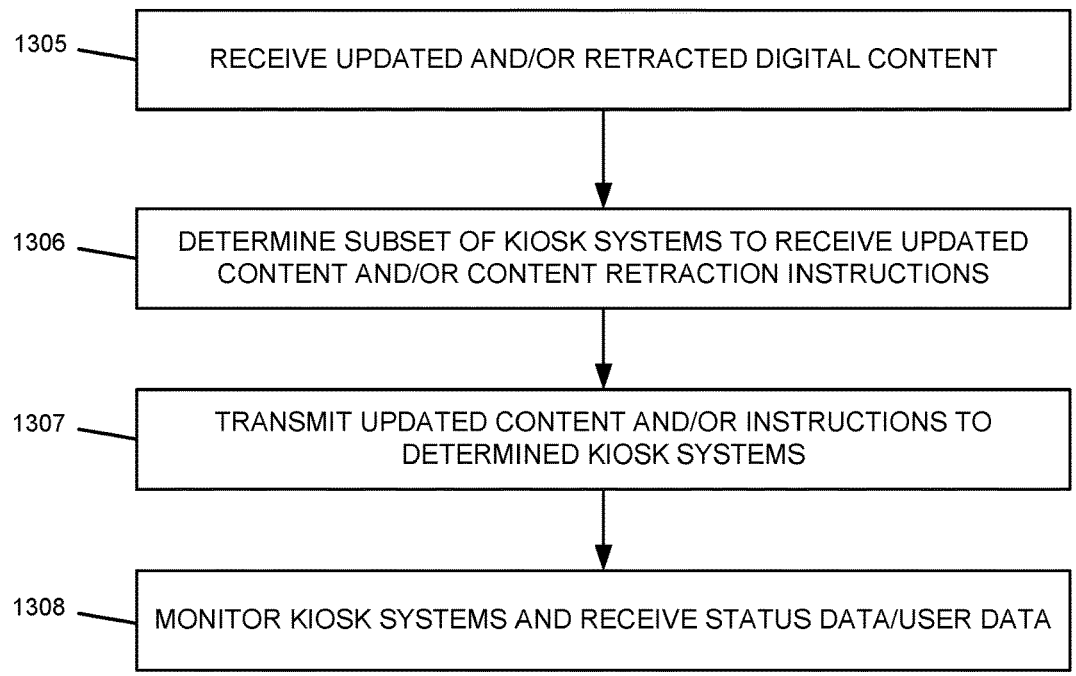
Figure 13C:
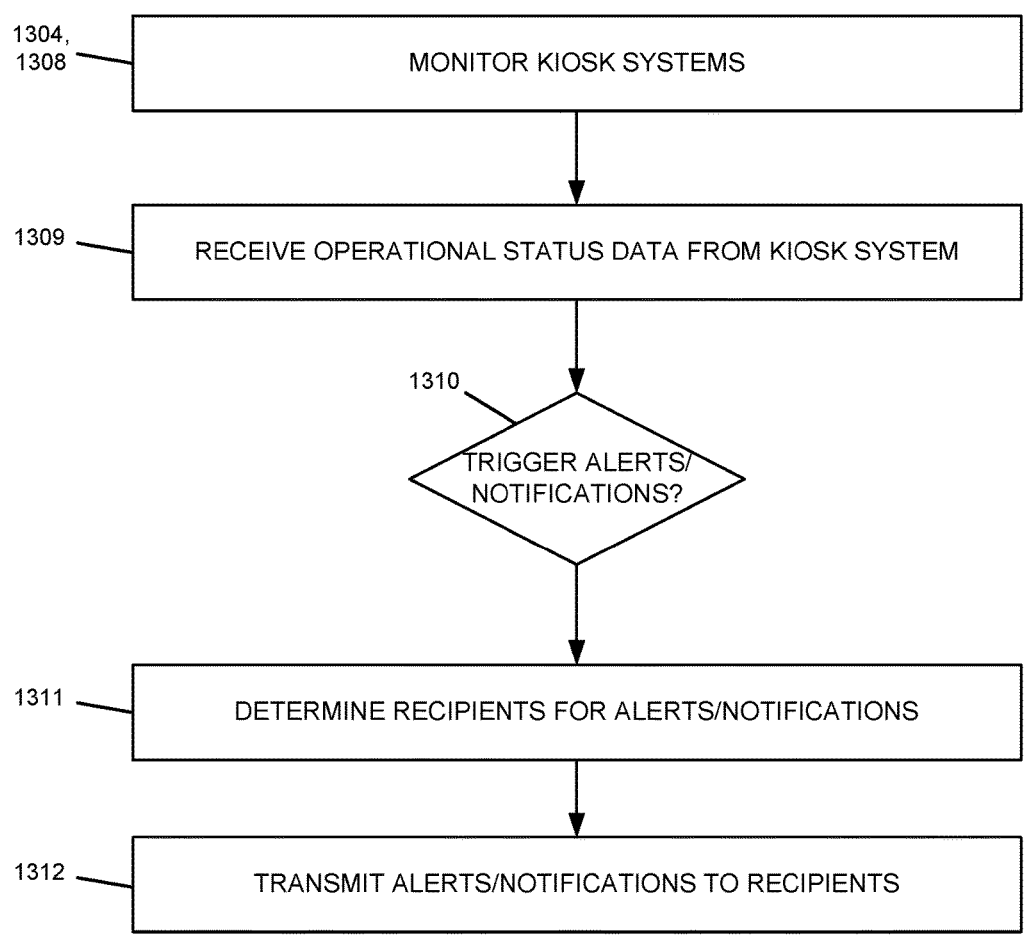

Referring now to FIGS. 13A-13C, three flow diagrams are shown illustrating example processes of determining and providing content to digital kiosk systems, and subsequently monitoring the digital kiosk systems. As discussed below, steps 1301-1312 in this example similarly may be performed by one or more components in the transaction systems described above (e.g., system 800), such as the central server system 820 operating in communication with content systems 821-824, web applications 830, and/or remote devices 811-812 at one or more locations 810. However, the various features and processes described herein need not be limited to the specific systems and hardware implementations described above in FIGS. 1-8.

Referring now to FIG. 13A, in step 1301, the central server system 820 may receive digital content from one or more content providers 821-824, to be transmitted out to one or more kiosk systems 812. Such content may correspond to, for example, digital advertisements, product information, pricing data, and the like. In step 1302, a kiosk monitoring/control engine 726 within the central server system 820, and/or an IoT cloud application 819 may determine a subset of the kiosk systems 812 to receive the digital content. As discussed above, in some cases the determination in step 1302 may be based on the type of the retail location 810 (or other location types) at which the various kiosk systems 812 reside. Additionally and/or alternatively, the determination may be based on the market areas/geographic regions of kiosk systems 812. In some cases, the digital content should be provided only to a specific geographic region based on language-compatibility, legal and compliance considerations, marketing studies, etc. Additionally, prevailing pricing data, tax data, product availability data, and the like, may be different across different regions and/or at different individual retail locations 810. Accordingly, the kiosk monitoring/control engine 726 and/or IoT cloud application 819 may use a combination of factors to determine the subset of kiosk systems 812 to receive the digital content in step 1302. In some cases, the kiosk monitoring/control engine 726 and/or IoT cloud application 819 also may perform language translations, currency conversions, and other customizations (including retail location-specific customizations) such as those discussed above in reference to FIG. 11, before distributing digital content a wider range of kiosk systems 812.

In step 1303, the central server system 820 (e.g., using a kiosk monitoring/control engine 726) may transmit the digital content to the determined subset of kiosk systems 812. As discussed above, the content may be provided/transmitted via one or more IoT cloud applications 819 and/or gateway devices 815. In some cases, data may be transmitted via 3G cellular telecommunications networks 806. In step 1304, the central server 820 may monitor the operation status of each kiosk system 812 scheduled to receive the digital content, for example, to confirm that the digital content has been successfully received and can be displayed by the kiosk system 812. The monitoring in step 1304 may be performed using the various infrastructure components discussed above, such as gateway device 815, cellular networks 806, and IoT cloud application 819, to provide the kiosk status data back to the central server system 820.

Referring now to FIG. 13B, a simplified process is shown for updating and/or retracting digital advertising or other digital content to one or more kiosk systems 812 in a network 800 of multiple kiosk systems. In step 1305, an update to digital content may be received, for example, from one or more of the content providers 821-824. In some cases, the update received in step 1305 may correspond to a retraction of a digital advertisement or other content received previously in step 1301. In step 1306, the kiosk monitoring/control engine 726 and/or IoT cloud application 819 may determine a subset of the kiosk systems 812 to receive the updated digital content and/or retraction of the digital content. In step 1307, the kiosk monitoring/control engine 726 may provide the updated digital content and/or data indicating the retraction to the determined kiosk systems 812. In step 1308, the central server system 820 may monitor the operation status of each kiosk system 812, for example, to confirm that the updated digital content and/or retraction has been successfully received and displayed by the kiosk system 812. Thus, steps 1305-1308 may be performed similarly or identical to steps 1301-1304, discussed above.

Referring now to FIG. 13C, a simplified process is shown for updating and/or retracting digital advertising or other digital content to one or more kiosk systems 812 in a network 800. Beginning in steps 1304 or 1308, the central server system 820 may monitor one or more kiosk systems 812 at one or more locations 810. In some embodiments, gateway devices 815 may transmit operational status data to IoT cloud applications 819 and/or kiosk monitor and control engines 726 as discussed above. In step 1309, the IoT cloud application 819 and/or kiosk monitor/control engine 726 may receive operational status data corresponding to a specific kiosk system 812. In step 1310, the IoT cloud application 819 and/or kiosk monitor/control engine 726 may determine whether or not alerts or notifications should be triggered based on the received status data. In some cases, the received status data may be compared to one or more status threshold values, which may be user-defined or system defined. In various examples, alerts and notifications may correspond to connections made by the kiosk system 812 (e.g., too many disconnects), signal strength on a cellular network (e.g., weak signal), network bandwidth, or traffic (e.g., heavy traffic devices), etc. In step 1311, the IoT cloud application 819 and/or kiosk monitor/control engine 726 may determine which client devices or applications should receive the alerts or notifications determined in step

1310. In various different cases, web applications 830, content provider systems 821-824, user devices 811 associated with employees/technicians/system administrators, and other computing devices/network addresses (e.g., email addresses, text messages, etc.) all may defined as recipients of alerts/notifications, depending on the particular kiosk system 812, the particular location 810, and/or the particular type of alerts or notifications. In step 1312, the IoT cloud application 819 and/or kiosk monitor/control engine 726 may transmit the determined alerts/notifications to the recipient devices or applications.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A multi-network transaction analysis system comprising:
   a digital kiosk system operating at a first location, the digital kiosk system comprising:
   a processing unit comprising one or more processors;
   a cellular network interface configured to transmit and receive cellular data signals;
   an input/output (I/O) subsystem configured to output digital content via one or more display screens; and
   memory coupled with and readable by the processing unit and storing therein a set of instructions which, when executed by the processing unit, causes the digital kiosk system to:
      transmit status data to a back-end system via the cellular network interface, wherein the status data indicates a first mobile computing device of one or more mobile computing devices that was wirelessly connected to a first digital kiosk of the digital kiosk system at a first time;
      receive digital content from the back-end system via the cellular network interface; and
      output the digital content received from the back-end system via the one or more display screens;
   the first mobile computing device of the one or more mobile computing devices, comprising:
      an internal global positioning system (GPS);
      one or more wireless network interfaces configured to wirelessly transmit data from and receive data at the mobile computing device;
      a processing unit comprising one or more processors; and
      memory coupled with and readable by the processing unit and storing therein a set of instructions which, when executed by the processing unit, causes the mobile computing device to:
         determine global positioning data for the mobile computing device via the internal global positioning system, at a time when the mobile computing device is wirelessly connected to the first digital kiosk of the digital kiosk system; and
         transmit mobile location data to the back-end system, the mobile location data comprising the GPS data and an identification of the wirelessly connected first digital kiosk at the first time;
   a client computer associated with an Internet-based transaction service, the client computer comprising:
      a processing unit comprising one or more processors;
      an input/output (I/O) subsystem configured to output digital content via one or more display screens; and
      an Internet network interface configured to securely transmit and receive transaction data via the Internet;
      memory coupled with and readable by the processing unit and storing therein a set of instructions which, when executed by the processing unit, causes the client computer to:
         receive data via the I/O subsystem corresponding to one or more Internet-based transactions; and
         transmit data corresponding to the Internet-based transactions via the Internet network interface to at least one server of the back-end system associated with the Internet-based transaction service, wherein the data corresponding to the Internet-based transactions indicates the first mobile computing device of the one or more mobile computing device was wirelessly connected to the client computer at the first location; and
   the back-end system, wherein the back-end system comprises one or more computer servers configured to communicate with the digital kiosk system operating at the first location, the one or more mobile computing devices, and the client computer associated with the Internet-based transaction service, wherein the one or more computer servers comprises:
      one or more processing units, each processing unit comprising one or more processors; and
      one or more memory devices respectively coupled to and readable by the one or more processing units, the memory devices storing therein one or more sets of instructions which, when executed by the processing units, causes one or more computer servers to:
         retrieve, from memory associated with the back-end system, stored location data indicating a location of the first digital kiosk of the digital kiosk system and the client computer being a second location at a second time, the stored location data comprising GPS data;
         receive the status data transmitted by the first digital kiosk of the digital kiosk system operating at the first location;
         receive the mobile location data transmitted by the first mobile computing device of the one or more mobile computing devices;
         receive and analyze data transmitted by the client computer associated with the Internet-based transaction service, the data corresponding to one or more Internet-based transactions occurring during a first time period including the first time, wherein the first time is subsequent to the second time; and compare, the GPS data indicated within the mobile location data to the stored location data, to determine that the first location is different from the second location; and update, based on the GPS data indicated within the mobile location data, the stored location data to indicate the location of the first digital kiosk of the digital kiosk system and the client computer as being the first location.

2. The multi-network transaction analysis system of claim 1, wherein the one or more computer servers of the back-end system are further configured to:

determine that a first user associated with the first mobile computing device initiated a transaction via the Internet-based transaction service, via the client computer during the first time period; and transmit data to the first mobile computing device to solicit feedback from the first user relating to the transaction.

3. The multi-network transaction analysis system of claim 2, wherein transmitting the data to the first mobile computing device to solicit feedback from the first user relating to the transaction comprises:

determining a user role associated with the first user;

determining one or more characteristics associated with at least one of the first location or the client computer;

selecting a user feedback interface from a plurality of user feedback interfaces stored at the back-end system, based on the determined user role and the determined one or more characteristics associated with at the first location or the client computer; and transmitting the user feedback interface to the first mobile computing device.

4. The multi-network transaction analysis system of claim 2, wherein the one or more computer servers of the back-end system are further configured to:

receive feedback data associated with the first user, from the first mobile computing device, relating to the transaction;

determine digital content for the first digital kiosk of the digital kiosk system, based on the received feedback data associated with the first user; and transmit the determined digital content to the first digital kiosk of the digital kiosk system.

5. The multi-network transaction analysis system of claim 4, wherein determining the digital content for the digital kiosk system comprises:

identifying one or more languages used to provide feedback via the one or more mobile computing devices, the feedback relating to transactions performed by the Internet-based transaction service and initiated by the client computer; and selecting a language for the determined digital content transmitted to the digital kiosk system, based on the one or more languages used to provide feedback.

6. The multi-network transaction analysis system of claim 1, wherein the one or more computer servers of the back-end system are further configured to:

identify a plurality of the mobile computing devices, including the first mobile computing device, that are near the first location at a particular time;

retrieve a plurality of user profile data stored at the back-end system, based on the identified plurality of mobile computing devices;

determine digital content for the first digital kiosk of the digital kiosk system, based on the retrieved plurality of user profile data; and transmit the determined digital content to the first digital kiosk of the digital kiosk system.

7. The multi-network transaction analysis system of claim 1, wherein the one or more computer servers of the back-end system are further configured to:

determining a location of the client computer based on the GPS data transmitted by the first mobile computing device.

8. The multi-network transaction analysis system of claim 1, wherein the one or more computer servers of the back-end system are further configured to:

determining, based at least in part on the status data, mobile location data, and data transmitted by the client computer, operational hours of a retail store associated with the first location.

9. The multi-network transaction analysis system of claim 1, wherein the one or more computer servers of the back-end system are further configured to:

determining that a user associated with the first mobile computing device initiated a transaction via the Internet-based transaction service, based on the data received from the client computer;

determining a third time associated with the transaction initiated by the first user via the Internet-based transaction service;

comparing the first time at which the first mobile computing device was near the first location to the third time associated with the transaction initiated by the first user; and determine a user wait time for the Internet-based transaction service at the first location, based on the comparison of the first time to the third time.

10. The multi-network transaction analysis system of claim 1, wherein the one or more computer servers of the back-end system are further configured to:

receiving data from the first mobile computing device including details of a transaction staged by a user on the first mobile computing device;

comparing the details of the transaction staged on the first mobile computing device to the data from the client computer corresponding to the one or more Internet-based transactions;

identifying a match within the data from the client computer to the transaction staged on the first mobile computing device; and based on the identification of the match, associating data collected by at least one of the first mobile computing device or the first digital kiosk of the digital kiosk system operating at the first location, with the client computer.

11. The multi-network transaction analysis system of claim 1, wherein the one or more computer servers of the back-end system are further configured to:

receive, from the digital kiosk system operating at the first location, a plurality of unique device identifies, corresponding to a plurality of mobile computing devices that were detected near the first location at a particular time;

retrieve a plurality of user identifier data stored at the back-end system, based on the plurality of unique device identifies; and transmit the plurality of user identifier data to the digital kiosk system.

12. The multi-network transaction analysis system of claim 11, wherein the digital kiosk system operating at the first location is further configured to:

detect, using a wireless beacon of the digital kiosk system, the plurality of mobile computing devices near the first location at the particular time;

determine an order at which the plurality of mobile computing devices were detected near the first location;

transmit the plurality of unique device identifies to the back-end system;

receive the plurality of user identifier data from the back-end system; and output the plurality of user identifier data via the one or more display screens, as an ordered list in the determined order at which the plurality of mobile computing devices were detected near the first location.

13. A method of analyzing a multi-network transaction system, comprising:

receiving, by a computer server, status data from a first digital kiosk system operating at a first location, wherein the status data indicates a first mobile computing device that was wirelessly connected to the first digital kiosk system at a first time;

receiving, by the computer server, mobile location data transmitted by the first mobile computing device, the mobile location data comprising global positioning (GPS) data and an identification of the wireless connection to the first digital kiosk system at the first time;

receiving, by the computer server, data from a client terminal associated with an Internet-based transaction service, the data corresponding to one or more Internet-based transactions occurring during a first time period including the first time;

retrieving stored location data indicating the location of the first digital kiosk system and a client computer being a second location at a second time, the stored location data comprising GPS data and wherein the first time is subsequent to the second time;

comparing the GPS data indicated within the mobile location data to the stored location data to determine that the first location is different from the second location; and updating, based on the GPS data indicated within the mobile location data, the stored location data to indicate the location of the first digital kiosk of the digital kiosk system and the client computer as being the first location.

14. The method of claim 13, further comprising:

determining that a first user associated with the first mobile computing device initiated a transaction via the Internet-based transaction service, via the client computer during the first time period; and transmitting data to the first mobile computing device to solicit feedback from the first user relating to the transaction.

15. The method of claim 14, wherein transmitting the data to the first mobile computing device to solicit feedback from the first user relating to the transaction comprises:

determining a user role associated with the first user;

determining one or more characteristics associated with at least one of the first location or the client computer;

selecting a user feedback interface from a plurality of user feedback interfaces, based on the determined user role and the determined characteristics associated with at the first location or the client computer; and transmitting the user feedback interface to the first mobile computing device.

16. The method of claim 14, further comprising:

receiving feedback data associated with the first user, from the first mobile computing device, relating to the transaction;

determining digital content for the first digital kiosk system, based on the received feedback data associated with the first user; and transmitting the determined digital content to the first digital kiosk system.

17. The method of claim 13, further comprising:

identifying a plurality of the mobile computing devices, including the first mobile computing device, that are near the first location at a particular time;

retrieving a plurality of user profile data, based on the identified plurality of mobile computing devices;

determining digital content for the first digital kiosk system, based on the retrieved plurality of user profile data; and transmitting the determined digital content to the first digital kiosk system.

18. The method of claim 13, further comprising:

determining a location of the client computer based on the GPS data transmitted by the first mobile computing device.

19. The method of claim 13, further comprising:

receiving data from the first mobile computing device including details of a transaction staged by a user on the first mobile computing device;

comparing the details of the transaction staged on the first mobile computing device to the data from the client computer corresponding to the one or more Internet-based transactions;

identifying a match within the data from the client computer to the transaction staged on the first mobile computing device; and based on the identification of the match, associating data collected by at least one of the first mobile computing device or the first digital kiosk system operating at the first location, with the client computer.

20. The method of claim 13, further comprising:

receiving, from the first digital kiosk system operating at the first location, a plurality of unique device identifies, corresponding to a plurality of mobile computing devices that were detected near the first location at a particular time;

retrieving a plurality of user identifier data, based on the plurality of unique device identifies; and transmitting the plurality of user identifier data to the digital kiosk system.

* * * * *